United States Patent
Chung et al.

(10) Patent No.: US 9,192,003 B2
(45) Date of Patent: Nov. 17, 2015

(54) ELECTRICAL LOAD DRIVING APPARATUS

(71) Applicants: City University of Hong Kong, Kowloon (HK); e.Energy Double Tree Limited, Kowloon (HK)

(72) Inventors: Shu Hung Henry Chung, Mid-Levels (HK); Ruihong Zhang, Kowloon (HK)

(73) Assignees: City University of Hong Kong, Hong Kong (HK); E. Energy Double Tree Limited, Hong Kong (HK)

( * ) Notice: Subject to any disclaimer, the term of this patent is extended or adjusted under 35 U.S.C. 154(b) by 90 days.

(21) Appl. No.: 13/836,648

(22) Filed: Mar. 15, 2013

(65) Prior Publication Data

US 2014/0265913 A1 Sep. 18, 2014

(51) Int. Cl.
*H05B 33/08* (2006.01)
*H02M 5/257* (2006.01)

(52) U.S. Cl.
CPC ......... *H05B 33/0815* (2013.01); *H02M 5/2573* (2013.01); *H05B 33/0845* (2013.01)

(58) Field of Classification Search
CPC .................................................. H05B 33/0815
USPC ......................................................... 315/291
See application file for complete search history.

(56) References Cited

U.S. PATENT DOCUMENTS

| | | | | |
|---|---|---|---|---|
| 8,330,391 | B2* | 12/2012 | Wendt et al. | 315/307 |
| 2008/0030148 | A1* | 2/2008 | Tang et al. | 315/291 |
| 2010/0039038 | A1* | 2/2010 | Lam et al. | 315/224 |
| 2011/0075057 | A1* | 3/2011 | Kim et al. | 348/790 |
| 2011/0080102 | A1* | 4/2011 | Ge et al. | 315/200 R |
| 2011/0194311 | A1* | 8/2011 | Gaknoki et al. | 363/21.12 |
| 2011/0285301 | A1* | 11/2011 | Kuang et al. | 315/200 R |
| 2012/0146530 | A1* | 6/2012 | Han et al. | 315/219 |
| 2013/0026936 | A1* | 1/2013 | Zhang et al. | 315/206 |
| 2014/0097808 | A1* | 4/2014 | Clark et al. | 323/208 |
| 2014/0117878 | A1* | 5/2014 | Prodic et al. | 315/307 |
| 2014/0159692 | A1* | 6/2014 | Tzinker et al. | 323/284 |

OTHER PUBLICATIONS

Norbert Hafner, LED Driving Technology for Long Term Flexibility, Apr. 2010, p. 1.*

* cited by examiner

*Primary Examiner* — Don Le
(74) *Attorney, Agent, or Firm* — Renner Kenner Greive Bobak Taylor & Weber

(57) ABSTRACT

An electrical load driving apparatus comprising a thyristor circuit arranged to control a transmission of electric power to an electrical load, wherein the thyristor circuit is connected to a conversion module arranged to convert a characteristic of the thyristor circuit to operate with a load characteristic of the electrical load.

26 Claims, 20 Drawing Sheets

ELECTRICAL LOAD DRIVING APPARATUS

TECHNICAL FIELD

The present invention relates to an electrical load driving apparatus, and particularly, although not exclusively, to a driving circuit for LED devices.

BACKGROUND

Lighting apparatus is essential for daily lives of human beings, for the illumination in dark/low-light environment, or as a supplementary visual aid in varies situations such as repair and maintenance. Lighting apparatus is also essential components such as backlight module of a flat panel display, and signal indicators.

In the past, lighting apparatus are usually made with incandescent or fluorescent light bulbs/tubes. With recent advances in solid-state lighting technology, high brightness (HB) light emitting diodes (LEDs) have been widely adopted in various commercial, residential and industrial lighting applications, due to their high luminous efficacy and long life expectancy. An LED lamp consists of a single HB-LED multiple LEDs connected in the form of arrays with each array having several LEDs connected together.

To meet the requirement of energy saving and various application of these lighting devices, various methods may be adopted to modulate the electrical power being delivered to the devices, so as to dim the light. However, known dimmers may not operate with all types of lighting devices or other electrical load with different characteristics.

SUMMARY OF THE INVENTION

In accordance with a first aspect of the present invention, there is provided an electrical load driving apparatus comprising a thyristor circuit arranged to control a transmission of electric power to an electrical load; wherein the thyristor circuit is connected to a conversion module arranged to convert a characteristic of the thyristor circuit to operate with a load characteristic of the electrical load.

In an embodiment of the first aspect, the conversion module is further arranged to shape an output current of the thyristor circuit.

In an embodiment of the first aspect, the conversion module is arranged to alter a reactive power delivered from the thyristor circuit.

In an embodiment of the first aspect, the conversion module is arranged to maintain a conductive state of the thyristor circuit.

In an embodiment of the first aspect, the conversion module is arranged to maintain a threshold on or above a holding current of the thyristor circuit to maintain the conductive state of the thyristor circuit.

In an embodiment of the first aspect, the conversion module further includes a switching network.

In an embodiment of the first aspect, the switching network is controlled by a controller to shape the output current of the thyristor circuit.

In an embodiment of the first aspect, the controller is arranged to shape the output current of the thyristor circuit by adjusting a duty cycle and/or a switching frequency of the switching network.

In an embodiment of the first aspect, the controller adjusts the duty cycle and/or the switching frequency of the switching network to alter the reactive power.

In an embodiment of the first aspect, the conversion module further includes a resonant convertor arranged to be controlled by the controller to regulate the electric power delivered to the electrical load.

In an embodiment of the first aspect, the resonant convertor is arranged to maintain a linearity of the electric power delivered to the electrical load.

In an embodiment of the first aspect, the controller is arranged to maintain the linearity of the electric power delivered to the electrical load by determining a firing angle of the thyristor circuit; selecting a corresponding phase shift relationship based on the firing angle; and modifying the linearity of the electric power delivered to the electrical load based on the selected corresponding phase shift relationship.

In an embodiment of the first aspect, the controller is further arranged to regulate the electric power delivered to the electrical load by removing line-frequency harmonics.

In an embodiment of the first aspect, the controller is arranged to remove the line frequency harmonics by adjusting the switching frequency of the switching network.

In an embodiment of the first aspect, the switching network comprises four switches.

In an embodiment of the first aspect, the switching network and the controller are integrated with a semiconductor packaging technology.

In an embodiment of the first aspect, the electrical load is one or more light emitting diodes (LEDs).

In an embodiment of the first aspect, the thyristor circuit comprises a TRIAC device and a plurality of resistive and capacitive components.

In accordance with a second aspect of the present invention, there is provided a method for operating an interface between a thyristor circuit and an electrical load comprising the steps of: detecting electric variables of the electrical load, the thyristor circuit and the interface; determining operating characteristics of the thyristor circuit; and adjusting the operating characteristics of the thyristor circuit based on the detected electric variables of the electrical load, the thyristor circuit and the interface to deliver a regulated electric power to the electrical load.

In an embodiment of the second aspect, the method for operating an interface between a thyristor circuit and an electrical load further comprising the steps of delivering at least one output signal to a switching circuit of the interface to adjust the operating characteristics of the thyristor circuit.

In an embodiment of the second aspect, the at least one output signals to the switching circuit are arranged to control a switching frequency and a duty cycle of the switching circuit.

In an embodiment of the second aspect, detecting electric variables of the electrical load, the thyristor circuit and the interface further comprises the steps of: detecting a current signal $i_L$ of the electrical load; detecting an output current signal $i_{out}$ and an output voltage signal $v_{out}$ of the thyristor circuit; and detecting an operating voltage signal $v_{dc}$ of the interface.

In an embodiment of the second aspect, determining operating characteristics of the thyristor circuit further comprising the steps of: determining a firing angle $\alpha$ of the thyristor circuit based on the detected output voltage signal $v_{out}$ of the thyristor circuit.

In an embodiment of the second aspect, adjusting the operating characteristics of the thyristor circuit further comprising the steps of: determining a reference voltage signal $v_{dc,ref}$ of the interface based on the firing angle $\alpha$ with a predetermined interface logic; determining an error voltage signal $\Delta v_{dc}$ of the interface based on the reference voltage signal $v_{dc,ref}$ and the operating voltage signal $v_{dc}$ of the interface; deriving a reference current signal $i_{out,ref}$ of the thyristor circuit based on the error voltage signal $\Delta v_{dc}$ of the interface; determining an error current signal $\Delta i_{out}$ of the thyristor circuit based on the reference current signal $i_{out,ref}$ of the thyristor circuit and the detected output current signal $i_{out}$ of the thyristor circuit; and deriving a modulating signal $v_m$ based on the error current signal $\Delta i_{out}$ of the thyristor circuit.

In an embodiment of the second aspect, deriving a reference current signal $i_{out,ref}$ of the thyristor circuit based on the error voltage further comprising the steps of determining a phase shift of the reference current signal $i_{out,ref}$ of the thyristor circuit based on the firing angle $\alpha$ and the predetermined interface logic; and determining an amplitude of the reference current signal $i_{out,ref}$ of the thyristor circuit based on the error voltage signal $\Delta v_{dc}$ of the interface.

In an embodiment of the second aspect, adjusting the operating characteristics of the thyristor circuit further comprising the steps of: determining a reference current signal $i_{L,ref}$ of the electrical load based on the firing angle $\alpha$; determining an error current signal $\Delta i_L$ of the electrical load based on the reference current signal $i_{L,ref}$ of the electrical load and the detected current signal $i_L$ of the electrical load; and deriving a carrier signal $v_c$ based on the error current signal $\Delta i_L$ of the electrical load.

In an embodiment of the second aspect, adjusting the operating characteristics of the thyristor circuit further comprising the steps of comparing the carrier signal $v_c$ with the modulating signal $v_m$ to derive the at least one output signal to be delivered to the switching circuit.

BRIEF DESCRIPTION OF THE DRAWINGS

Embodiments of the present invention will now be described, by way of example, with reference to the accompanying drawings in which.

Figure 17A:
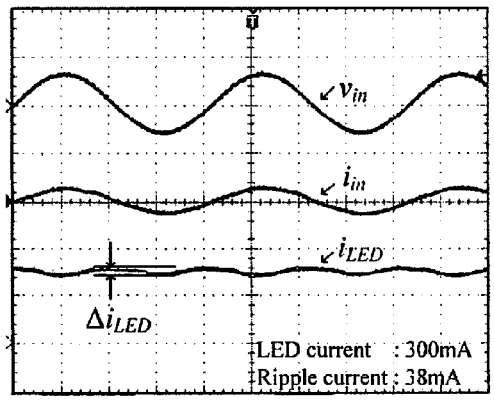
Figure 17B:
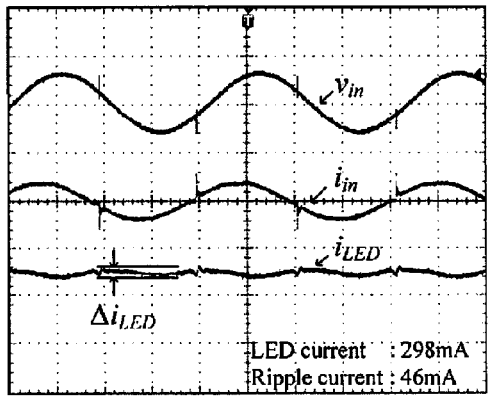
Figure 17C:
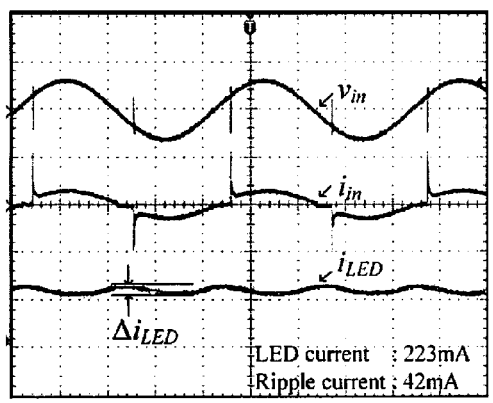
Figure 17D:
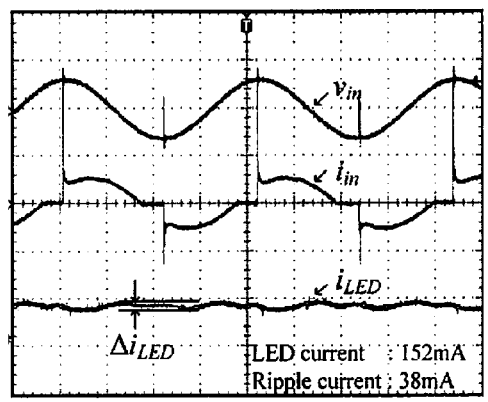
Figure 17E:
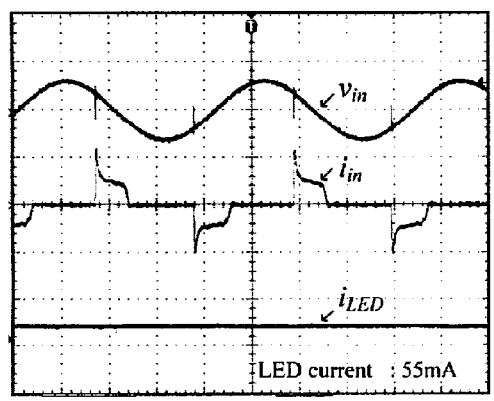
Figure 17F:
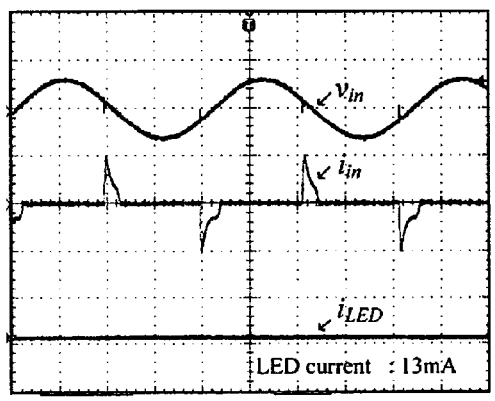
Figure 18:
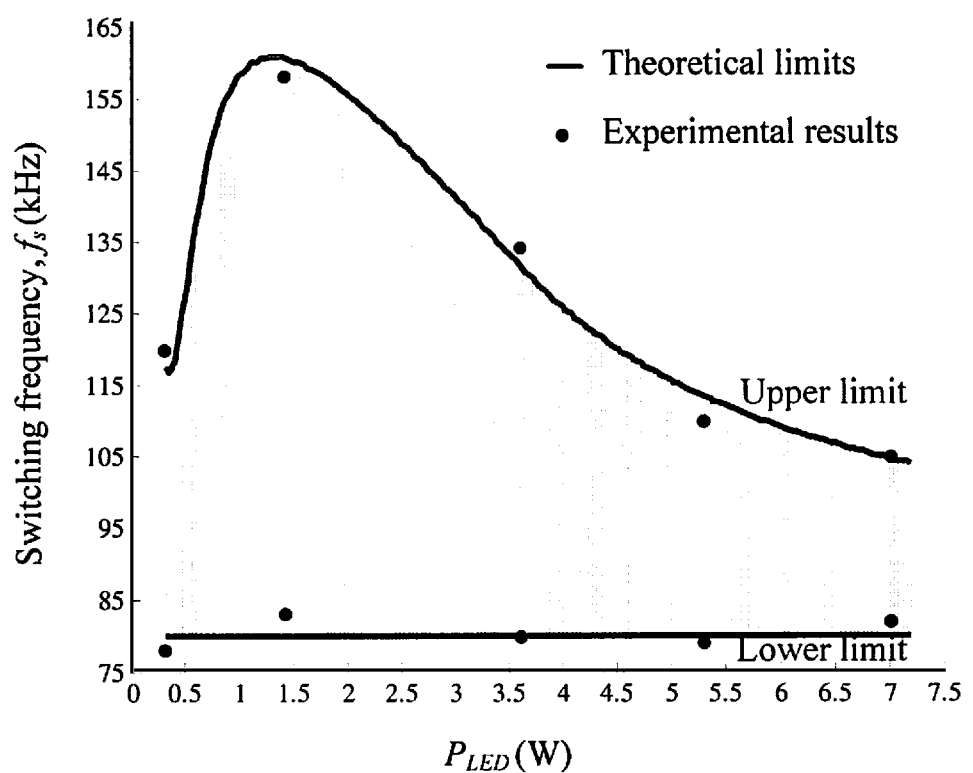
Figure 19:
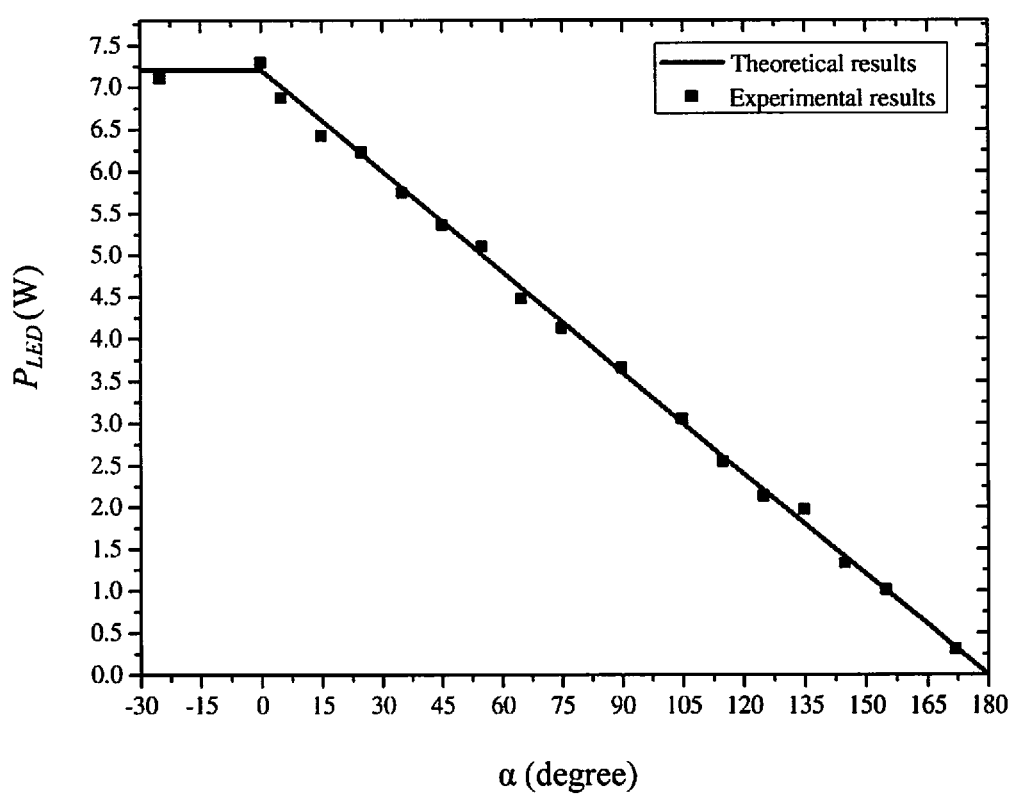

for different lamp power and m=2.5;

FIG. 17A is a diagram showing the waveforms of the input voltage $v_{in}$, input current $i_{in}$, and LED array current $i_{LED}$ of the electrical load driving apparatus of FIG. 4 when the lamp is connected to the ac mains without TRIAC;

FIG. 17B is a diagram showing the waveforms of the input voltage $v_{in}$, input current $i_{in}$, and LED array current $i_{LED}$ of the electrical load driving apparatus of FIG. 4 when the firing angle is −25°;

FIG. 17C is a diagram showing the waveforms of the input voltage $v_{in}$, input current $i_{in}$, and LED array current $i_{LED}$ of the electrical load driving apparatus of FIG. 4 when the firing angle is 45°;

FIG. 17D is a diagram showing the waveforms of the input voltage $v_{in}$, input current $i_{in}$, and LED array current $i_{LED}$ of the electrical load driving apparatus of FIG. 4 when the firing angle is 90°;

FIG. 17E is a diagram showing the waveforms of the input voltage $v_{in}$, input current $i_{in}$, and LED array current $i_{LED}$ of the electrical load driving apparatus of FIG. 4 when the firing angle is 145°;

FIG. 17F is a diagram showing the waveforms of the input voltage $v_{in}$, input current $i_{in}$, and LED array current $i_{LED}$ of the electrical load driving apparatus of FIG. 4 when the firing angle is 172°;

FIG. 18 is a diagram showing the theoretical and measured switching frequencies of the switches of the electrical load driving apparatus of FIG. 4 versus the lamp power;

FIG. 19 is a diagram showing the theoretical and measured results of the relationship between the output power and firing angle of the electrical load driving apparatus of FIG. 4.

DETAILED DESCRIPTION OF THE INVENTION

The inventors have, through their own research, trials and experiments, devised that, to enable full compatibility, the operational features of LED lamps are always expected to exhibit similar to or better than that of the incandescent lamps. Among them, compatibility of the LED lamps with thyristor circuits or known as TRIAC-based light dimmers has attracted much research interest, since many TRIAC-based light dimmers had been installed in various places, originally for controlling incandescent lamps. However, the evolution of a technology that allows LED lamps to perform wide range dimming is still less impressive. The main difficulty arises from the low LED lamp input current, and the high and diversified magnitude of the TRIAC holding current.

Practically, the holding current of TRIAC ranges from 20 mA to 80 mA while the input current of LED lamps can be less than 60 mA, hindering the compatibility of LED lamps with different TRIAC-based light dimmers. For the same lamp brightness, the input current of LED lamps is only one-tenth of the incandescent lamps, and its magnitude is too small to hold the TRIAC in the conduction state after the TRIAC is latched. Thus, existing TRIAC-dimmable LED lamp drivers cannot provide a very wide dimming range.

In an example embodiment, the LED current of a 15 W LED lamp can be controlled with driver using a flyback converter with primary-side regulation. The adjustable dimming range reported is from 35° to 150° of firing angle. In another example embodiment, an active damper circuit together with the primary-side regulation method provides sufficient turn-on input current with smaller power consumption, as compared with the passive damper circuit, in order to latch the conduction state of the TRIAC. However, the effect of the holding current of the TRIAC on the dimming range has not been addressed. The maximum dimming range reported is around 130°. Thus, challenges will appear if the dimmed power level is further reduced.

Figure 1:
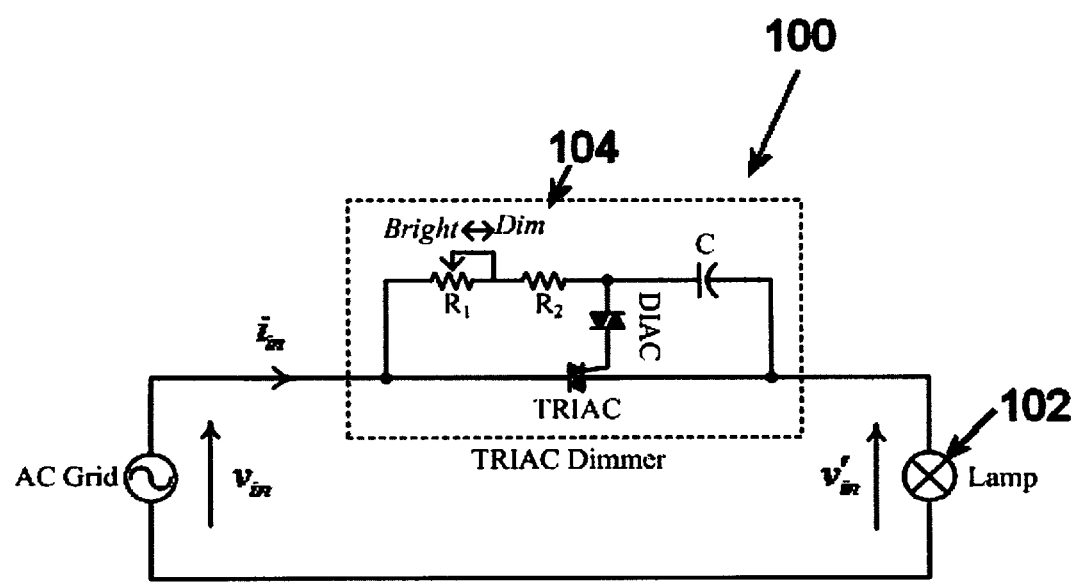
FIG. 1 is a schematic diagram illustrating an output load powered by a typical thyristor circuit of a TRIAC-based light dimmer.
Figure 2:
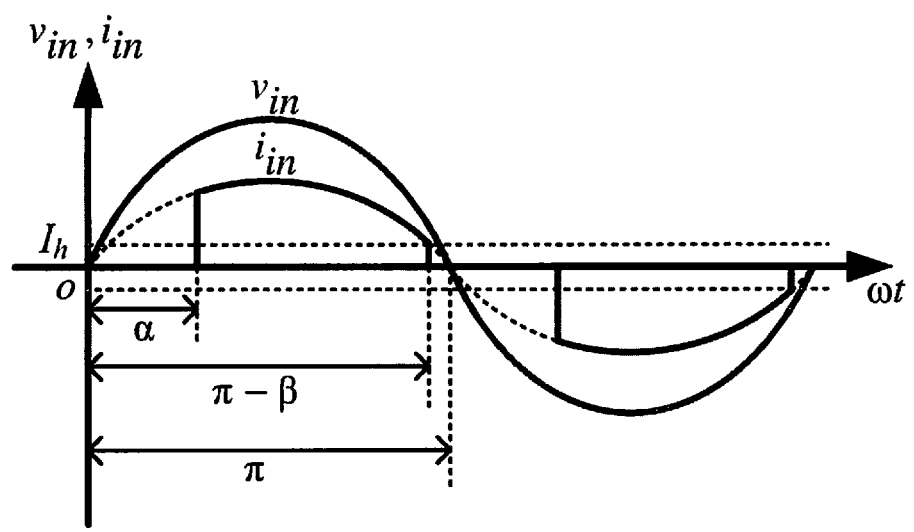
FIG. 2 is a diagram showing a typical waveforms of the line voltage $v_{in}$ and the input current $i_{in}$ of the output load controlled by a thyristor circuit of FIG. 1.
Figure 3:
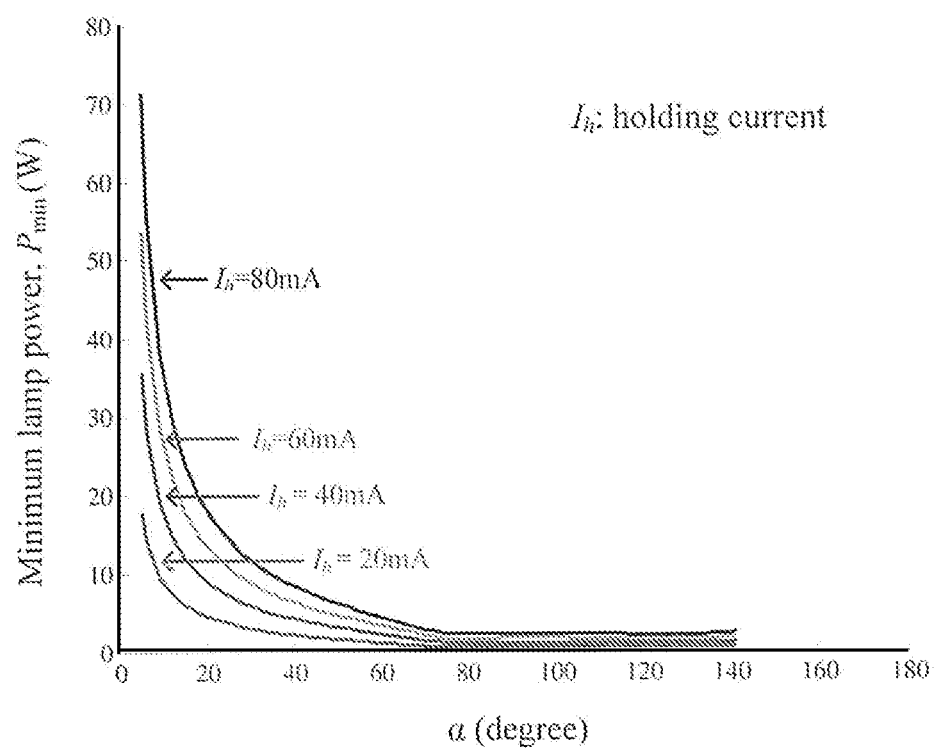
FIG. 3 is a diagram showing the minimum lamp power $P_{min}$ against the firing angle $\alpha$ with holding current ranging from 20 mA to 80 mA under the condition that the conduction time of the TRIAC is not less than 30° and the load is purely resistive.

With reference to FIG. 1, there is shown a schematic diagram of an output load 102 powered by a typical thyristor circuit 104 of a TRIAC-based light dimmer. The resistors $R_1$ and $R_2$, and capacitor C form an RC network. $R_1$ is used to adjust the phase and the voltage across C. When the voltage across the capacitor C reaches the breakdown voltage of the diode for alternating current (DIAC), a gate signal will be applied to the triode for alternating current (TRIAC). The control knob of $R_1$ can thus control the firing angle (turn-on time) of the TRIAC and lamp power. FIG. 2 shows a typical waveforms of the line voltage $v_{in}$ and the input current $i_{in}$ of the lamp controlled by a thyristor circuit 100. The angles α and (π–β) are the firing angle and extinction angle of the TRIAC, respectively. The TRIAC is turned off naturally at (π–β) when $i_{in}$ is less than the holding current $I_h$. FIG. 3 shows the minimum lamp power $P_{min}$ against the firing angle α with holding current ranging from 20 mA to 80 mA under the condition that the conduction time of the TRIAC is not less than 30° and the load is purely resistive. Generally, the higher the holding current, the higher the minimum lamp power is. For example, at α=10°, $P_{min}$=10 W when $I_h$=20 mA, and $P_{min}$=40 W when $I_h$=80 mA. Thus, the curves can explain why low-power LED lamps have limited dimming range and easily flicker.

Alternatively, the above problem can be lessened by adding a resistor, namely bleeding circuit, in the lamp driver in order to consume minimum power. However, this will introduce extra power loss in the whole driver.

Alternatively, a TRIAC-dimmable LED driver does not require any bleeding circuit. The concept is based on reducing the conduction time of the TRIAC when the firing angle is large. It allows the dimmer to turn off if the input current is lower than the holding current. Thus, the input current is pulsating.

Alternatively, the circuit is extended from the ballast for compact fluorescent lamps. It consists of a capacitor network for increasing the input current and thus maintaining the TRIAC conduction. In this example embodiment, the LED current is pulsating and the maximum dimming is about 10%.

In a preferred embodiment, a thyristor circuit dimmer, also known as a TRIAC-dimmable LED lamp driver allowing wide dimming range consists of two power conversion stages. The first stage controls the active and reactive power drawn from the line, so that the input current is programmed to satisfy the minimum holding current requirement. Advantageously, the lamp can thus exhibit a wide dimming range. Preferably, the second stage is an isolated resonant converter for regulating the LED array current. Preferably, the lamp power is controlled to be in linear relationship with the firing angle. Preferably, the two converters share the same switching network.

Figure 4A:
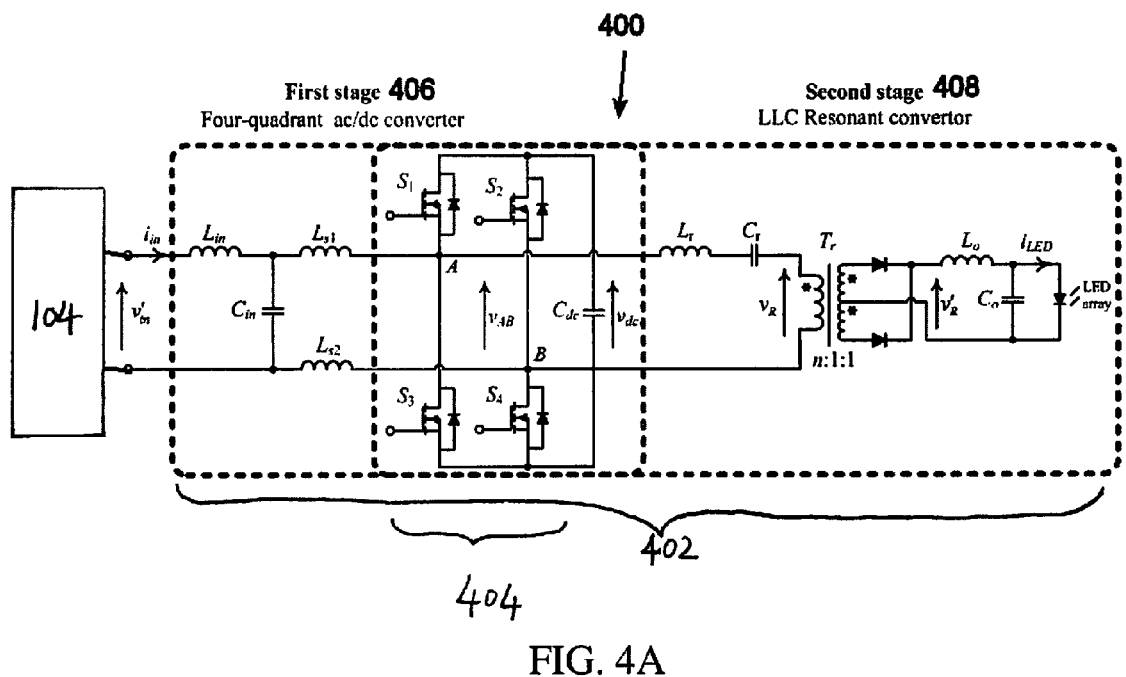
FIG. 4A is a schematic diagram of an electrical load driving apparatus in accordance with one embodiment of the present invention.

Referring to FIG. 4A, there is shown an electrical load driving apparatus 400 comprising: a thyristor circuit 104 arranged to control a transmission of electric power to an electrical load; wherein the thyristor circuit 102 is connected to a conversion module 402 arranged to convert a characteristic of the thyristor circuit 104 to operate with a load characteristic of the electrical load 102.

Preferably, the conversion module 402 consists of two power conversion stages. The first stage is a four-quadrant ac-dc converter 406 and the second stage is an LLC resonant converter 408. The two converters share a switching network 404 controlled by a controller (not shown), preferably the switching network comprises 4 switches $S_1 \sim S_4$.

Alternatively, the switching network may comprise any number of switches, and alternatively these switches, optionally including their drivers, controllers, and other transistors, can be integrated with current semiconductor packaging technologies.

Figure 5:
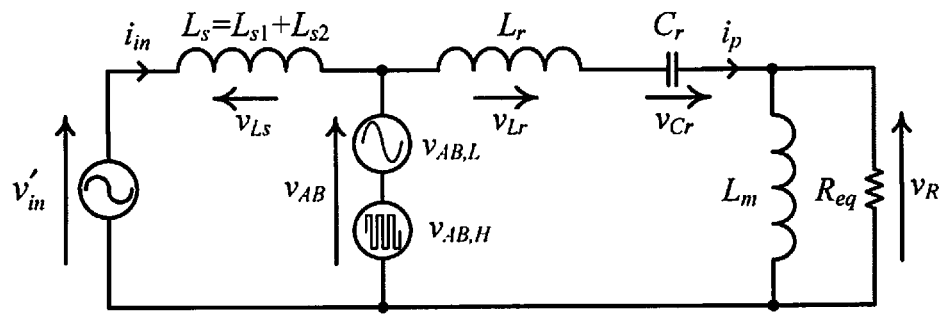
FIG. 5 is a schematic diagram of an equivalent circuit model of the power stage of the electrical load driving apparatus of FIG. 4A.

Referring to FIG. 5, there is shown an equivalent circuit model of the power stage of an example embodiment as shown and FIG. 4A. The ac side of the switching network is represented by a voltage source $v_{AB}$, which is composed of a low-frequency component $v_{AB,L}$ and a high-frequency component $v_{AB,H}$. The secondary side of the transformer $T_r$ is referred to the primary side and is modeled by an equivalent resistor $R_{eq}$.

In a preferred embodiment, the four-quadrant ac-dc converter is composed of an input filter formed by the inductor $L_{in}$ and the capacitor $C_{in}$, inductors $L_{s1}$ and $L_{s2}$, switches $S_1$~$S_4$, and dc-link capacitor $C_{dc}$. It is connected to the output stage through the nodes 'A' and 'B'. The input current $i_{in}$ is programmed to be lagging, in-phase, or leading $v_{in}$, so that the active and reactive power drawn from $v_{in}$ are controlled and $i_{in}$ is kept higher than the holding current of the TRIAC on dimming.

Preferably, as the voltage waveform across the input filter capacitor $C_{in}$ is nearly the same as the output voltage of the thyristor circuit $v_{in}'$. For the sake of simplicity in the analysis, the input filter formed by the inductor $L_{in}$ and the capacitor $C_{in}$ is excluded in FIG. 5.

Let the lamp power $P_{LED}$ vary linearly with the firing angle $\alpha$. $P_{LED}$ is expressed as $$P_{LED}(\alpha) = \begin{cases} P_r & \alpha < 0 \\ P_r\left(1 - \dfrac{\alpha}{\pi}\right) & 0 \le \alpha < \pi \end{cases} \quad (1)$$

where $P_r$ is the rated lamp power.

The voltages $v_{in}$, $v'_{in}$ and the input current $i_{in}$ are expressed as $$v_{in}(t) = V_m \sin\omega t \quad (2)$$

$$v'_{in}(t) = \begin{cases} 0 & \varphi \le \omega t < \alpha \\ V_m \sin\omega t & \alpha \le \omega t < \pi + \varphi \end{cases} \quad (3)$$

$$i_{in}(t) = \begin{cases} 0 & \varphi \le \omega t < \alpha \\ I_m \sin(\omega t - \varphi) & \alpha \le \omega t < \pi + \varphi \end{cases} \quad (4)$$

where $V_m$ and $I_m$ are the amplitude of the input voltage $v_{in}$ and input current $i_{in}$, respectively, $\omega$ is the angular line frequency, and $\varphi$ is the phase difference between $v_{in}$ and $i_{in}$.

Figure 6A:
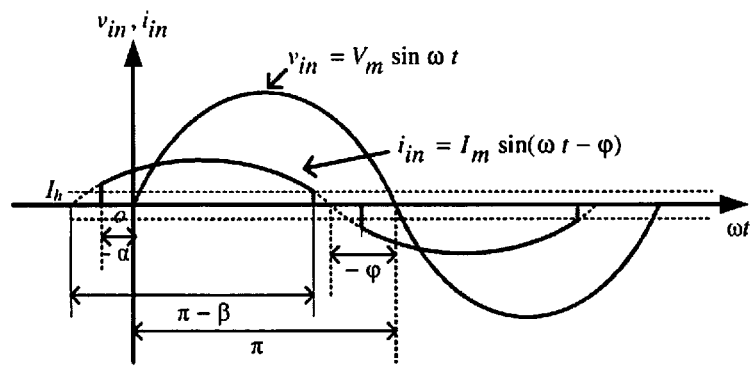
FIG. 6A is a diagram showing a waveform of a TRIAC when "$i_{in}$ leads $v_{in}$ (i.e., $\phi<0°$)" and $\alpha$ is negative.
Figure 6B:
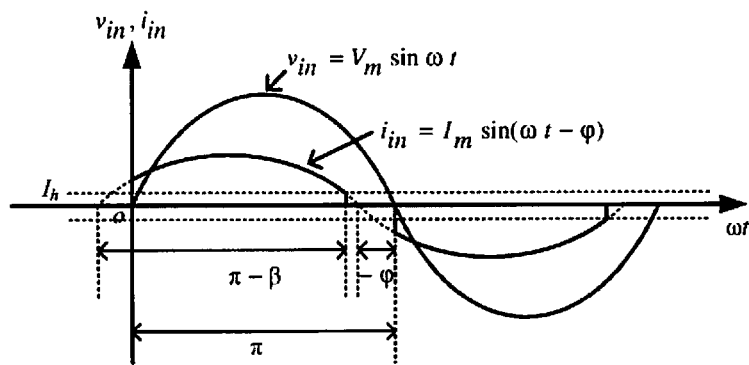
FIG. 6B is a diagram showing a waveform of a TRIAC when "$i_{in}$ leads $v_{in}$ (i.e., $\phi<0°$)" and $\alpha$ is zero.
Figure 6C:
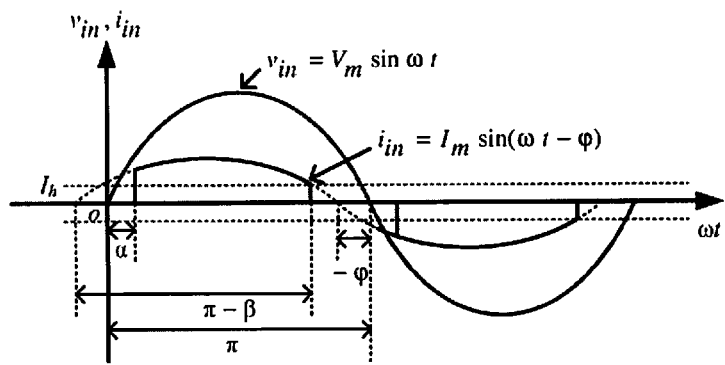
FIG. 6C is a diagram showing a waveform of a TRIAC when "$i_{in}$ lags $v_{in}$ (i.e., $\phi>0°$)" and $\alpha$ is positive.
Figure 7A:
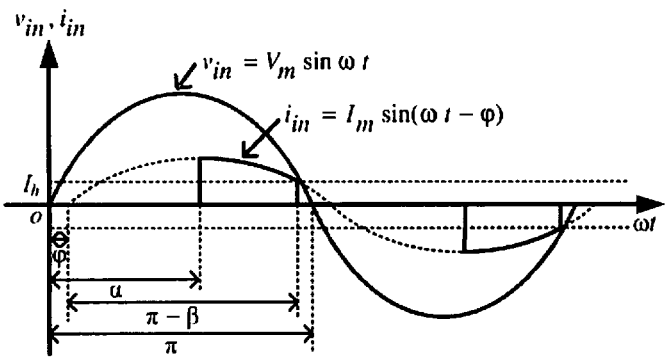
FIG. 7A is a diagram showing a waveform of a TRIAC when "$i_{in}$ lags $v_{in}$ (i.e., $\phi>0°$)" and $\phi<\beta$.
Figure 7B:
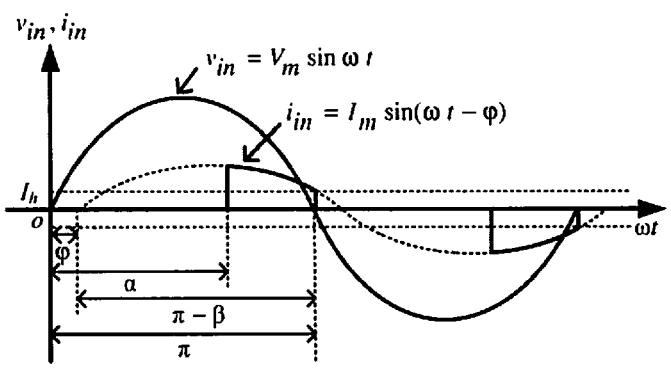
FIG. 7B is a diagram showing a waveform of a TRIAC when "$i_{in}$ lags $v_{in}$ (i.e., $\phi>0°$)" and $\phi=\beta$.
Figure 7C:
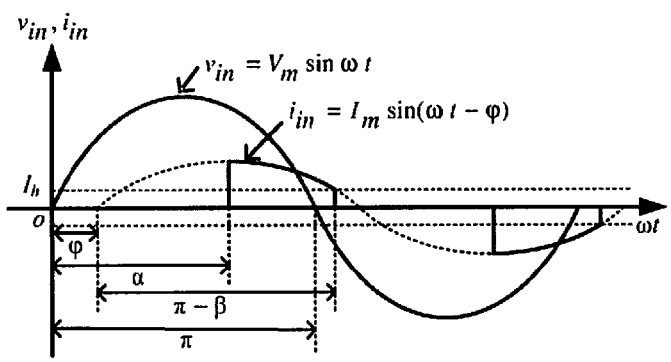
FIG. 7C is a diagram showing a waveform of a TRIAC when "$i_{in}$ leads $v_{in}$ (i.e., $\phi<0°$)" and $\phi>\beta$.

There are three possible operational cases. They are Case I—"$i_{in}$ leads $v_{in}$ (i.e., $\varphi<0°$)", Case II—"$i_{in}$ is in phase with $v_{in}$ (i.e., $\varphi=0°$)", and Case III—"$i_{in}$ lags $v_{in}$ (i.e., $\varphi>0°$)". The three cases are illustrated in FIG. 6, FIG. 2, and FIG. 7 respectively. Case I is operated when $\alpha$ is small. $\alpha$ can be negative, zero or positive with different TRIAC holding currents. Their waveforms are shown in FIG. 6A, FIG. 6B, and FIG. 6C, respectively. Case III is operated when $\alpha$ is large. Since $\beta$ is operating-point-dependent, there will have three possible scenarios in Case III, including $\varphi<\beta$, $\varphi=\beta$, and $\varphi>\beta$. Their waveforms are shown in FIG. 7A, FIG. 7B, and FIG. 7C, respectively.

The average input active power $P_{avg}$ in all three cases is expressed as $$P_{avg}(\alpha, \beta, \varphi) = \dfrac{1}{2\pi}\begin{bmatrix} \int_\alpha^{\pi+\varphi-\beta} V_m I_m \sin\theta \sin(\theta - \varphi)d\theta + \\ \int_{\pi+\alpha}^{2\pi+\varphi-\beta} V_m I_m \sin\theta \sin(\theta - \varphi)d\theta \end{bmatrix} \quad (5)$$

$$= \dfrac{V_m I_m}{2\pi}[(\pi - \alpha - \beta + \varphi)\cos\varphi + \sin(\alpha + \beta - \varphi)\cos(\alpha - \beta)]$$

Consider the critical condition that the input current at the extinction angle equals $I_h$.

$$I_h = I_m \sin\beta \quad (6)$$

To ensure stable operation, $i_{in}$ should not be less than $I_h$ over the TRIAC conduction time. Thus, when TRIAC is turned on at $\omega t=\alpha$, based on (4)

$$I_m \sin(\alpha - \varphi) \ge I_h \quad (7).$$

By substituting (6) into (7), $$\beta \le \alpha - \varphi \le \pi - \beta \quad (8).$$

The curves shown in FIG. 3 are obtained by using (5) and (6), and putting $\varphi=0°$, $\beta=\alpha$ for $\pi/36 \le \alpha \le 5\pi/12$, and putting $\varphi=0$, $\beta=\alpha+\pi/6$ for $5\pi/12 \le \alpha < \pi$.

Then, assume that the system efficiency is 100%, thus $P_{avg}=P_{LED}$. By putting (1) and (6) into (5), $$P_r\left(1 - \dfrac{\alpha}{\pi}\right) = \dfrac{V_m I_h}{2\pi \sin\beta}[(\pi - \alpha - \beta + \varphi)\cos\varphi + \sin(\alpha + \beta - \varphi)\cos(\alpha - \beta)]. \quad (9)$$

The rms value of the input voltage $v_{in}$, $V_{rms}$, is $$V_{rms} = \dfrac{V_m}{\sqrt{2}}. \quad (10)$$

The rms value of the input current $i_{in}$, $I_{rms}$, is $$I_{rms}(\alpha, \beta, \varphi) = \sqrt{\dfrac{1}{2\pi}\left\{\begin{array}{l}\int_\alpha^{\pi+\varphi-\beta}[I_m \sin(\theta - \varphi)]^2 d\theta + \\ \int_{\pi+\alpha}^{2\pi+\varphi-\beta}[I_m \sin(\theta - \varphi)]^2 d\theta\end{array}\right\}} \quad (11)$$

$$= I_m \sqrt{\dfrac{1}{2\pi}\left[\begin{array}{c}(\pi - \alpha - \beta + \varphi) + \\ \sin(\alpha + \beta - \varphi)\cos(\alpha - \beta - \varphi)\end{array}\right]}.$$

The apparent input power S is $$S(\alpha, \beta, \varphi) = V_{rms} I_{rms} = \quad (12)$$

$$\dfrac{V_m I_m}{2}\sqrt{\dfrac{1}{\pi}[(\pi - \alpha - \beta + \varphi) + \sin(\alpha + \beta - \varphi)\cos(\alpha - \beta - \varphi)]}.$$

By using (5) and (12), the input power factor PF is $$PF(\alpha, \beta, \varphi) = \dfrac{P_{avg}}{S} \quad (13)$$

$$= \dfrac{(\pi - \alpha - \beta + \varphi)\cos\varphi + \sin(\alpha + \beta - \varphi)\cos(\alpha - \beta)}{\sqrt{\pi[(\pi - \alpha - \beta + \varphi) + \sin(\alpha + \beta - \varphi)\cos(\alpha - \beta - \varphi)]}}.$$

Figure 8:
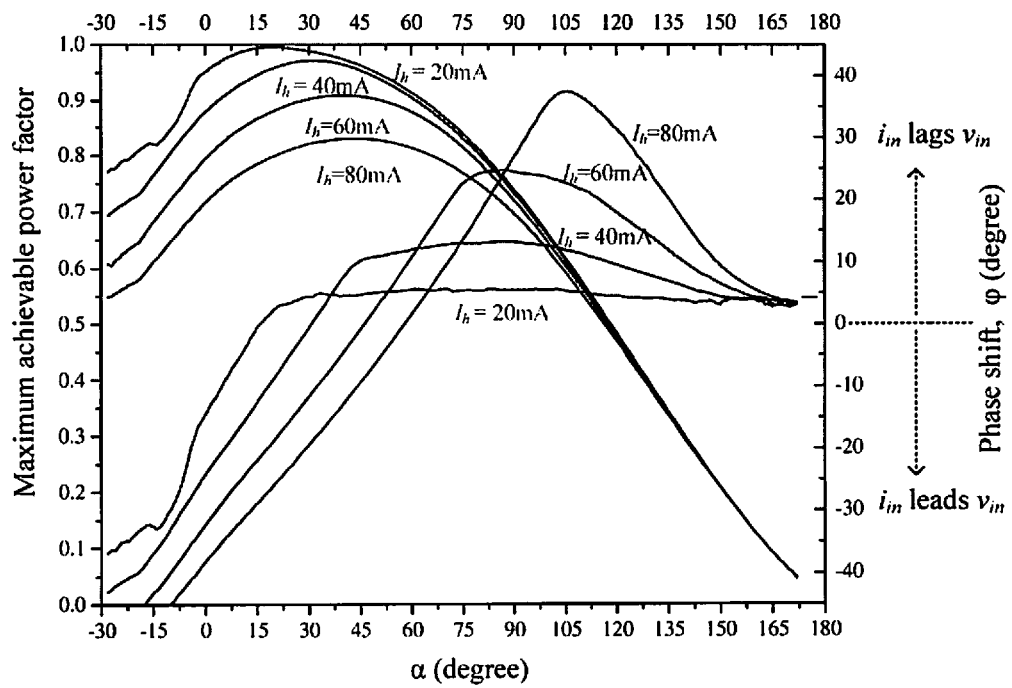
FIG. 8 is a diagram illustrates the maximum achievable power factor with different values of $\alpha$ and $I_h$ ranging from 20 mA to 80 mA, and the required values of $\phi$ for giving the maximum power factor.

Equation (13) gives the input power factor with different values of $\alpha$, $\beta$, and $\varphi$ that can satisfy the required power level given in (9). Thus, PF can be maximized by changing $\varphi$. FIG. 8 illustrates the maximum achievable power factor with different values of $\alpha$ and $I_h$ ranging from 20 mA to 80 mA, and the required values of $\varphi$ for giving the maximum power factor. In an example embodiment, the parameters used in the analysis are given in Table 1, in which the rated power is 7.2 W.

With reference to FIG. 8, the phase shift $\varphi$ has to be varied with $\alpha$ and $I_h$. This is impractical as the holding current of a TRIAC is difficult to be determined. Thus, preferably, a fixed relationship between $\alpha$ and $\varphi$ is designed by linearizing the curve $\varphi-\alpha$ when the holding current is 80 mA in FIG. 8 and is given in FIG. 9. When $\alpha<0$, $\varphi$ is constant and equals the phase shift till α=0. When 0≤α<α$_1$, φ is negative and reduces linearly with α. When α$_1$<α<α$_2$, φ is positive and increases linearly with α. When α$_2$<α<172°, φ is positive and reduces linearly with α. α$_1$ and α$_2$ are chosen by considering the PF–α curve in FIG. 8 under the maximum holding current (i.e., I$_h$=80 mA) at which φ=0° and φ is maximum for "i$_{in}$ lags v$_{in}$", respectively. α$_1$=60° and α$_2$=105° are chosen in FIG. 9. Although the resulting power factor with the simplified phase shift control is slightly different from the maximum achievable power factor, it is still acceptable in practice.

The voltage between nodes 'A' and 'B', v$_{AB}$, is $$v_{AB} = \begin{cases} +v_{dc}, & \text{when } S_1 \text{ and } S_4 \text{ are on, and } S_2 \text{ and } S_3 \text{ are off} \\ -v_{dc}, & \text{when } S_2 \text{ and } S_3 \text{ are on, and } S_1 \text{ and } S_4 \text{ are off} \end{cases}. \quad (14)$$

Figure 10:
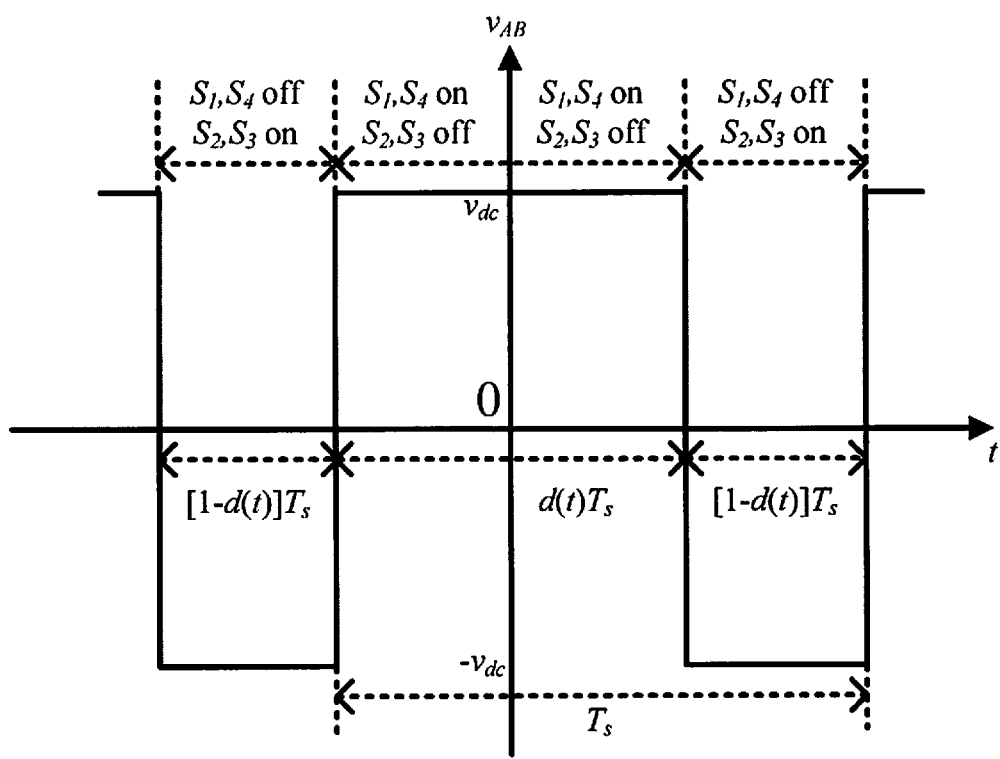
FIG. 10 is a diagram showing the voltage waveform between nodes 'A' and 'B', $v_{AB}$, in the relation of $$v_{AB} = \begin{cases} +v_{dc}, & \text{when } S_1 \text{ and } S_4 \text{ are on, and } S_2 \text{ and } S_3 \text{ are off} \\ -v_{dc}, & \text{when } S_2 \text{ and } S_3 \text{ are on, and } S_1 \text{ and } S_4 \text{ are off} \end{cases};$$
Figure 11A:
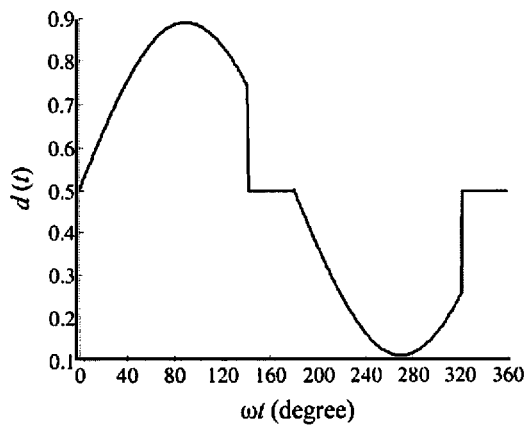
FIG. 11A is a diagram showing the variations of d(t) over a line cycle at $\alpha=0°$.
Figure 11B:
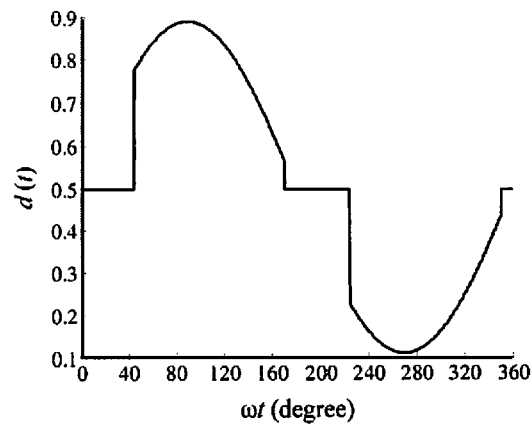
FIG. 11B is a diagram showing the variations of d(t) over a line cycle at $\alpha=45°$.
Figure 11C:
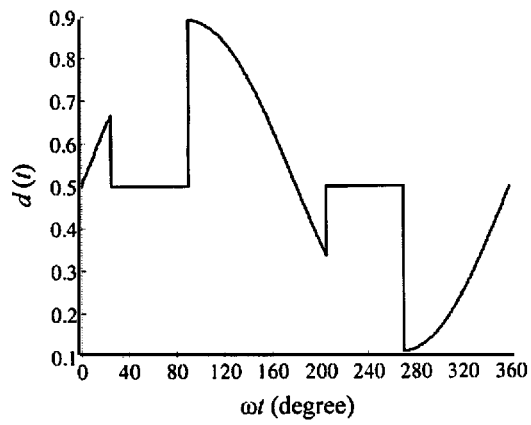
FIG. 11C is a diagram showing the variations of d(t) over a line cycle at $\alpha=90°$.
Figure 11D:
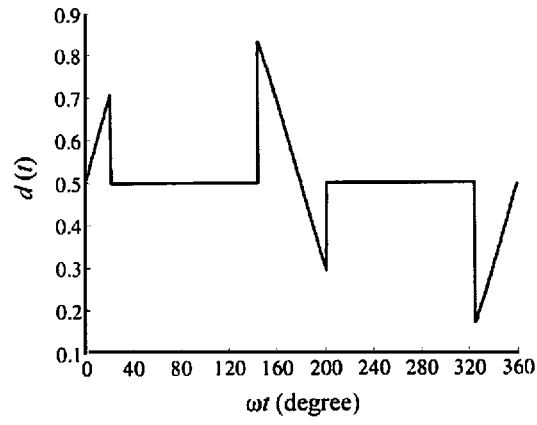
FIG. 11D is a diagram showing the variations of d(t) over a line cycle at $\alpha=145°$.
Figure 12A:
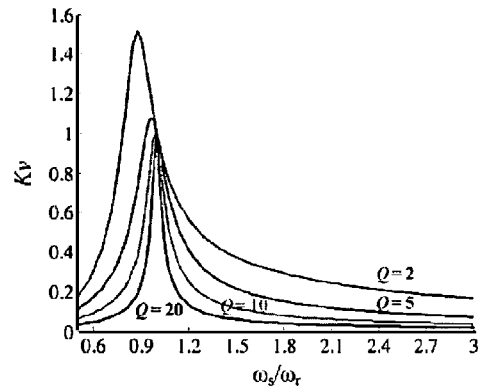
FIG. 12A is a diagram showing the relationships between $K_v$ and $\omega_s/\omega_r$ with different combinations of the values of Q when m=0.5.
Figure 12B:
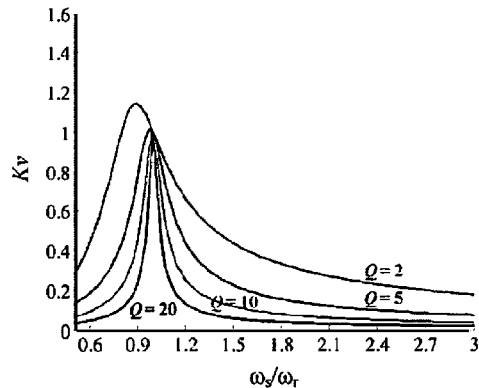
FIG. 12B is a diagram showing the relationships between $K_v$ and $\omega_s/\omega_r$ with different combinations of the values of Q when m=1.
Figure 12C:
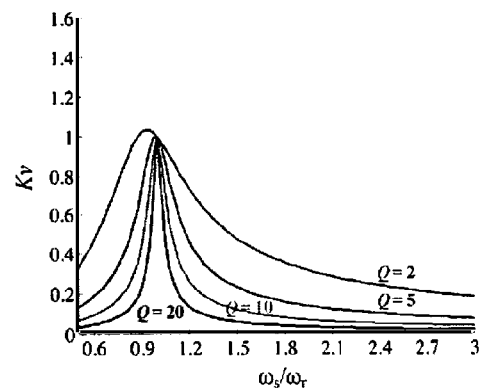
FIG. 12C is a diagram showing the relationships between $K_v$ and $\omega_s/\omega_r$ with different combinations of the values of Q when m=2.
Figure 12D:
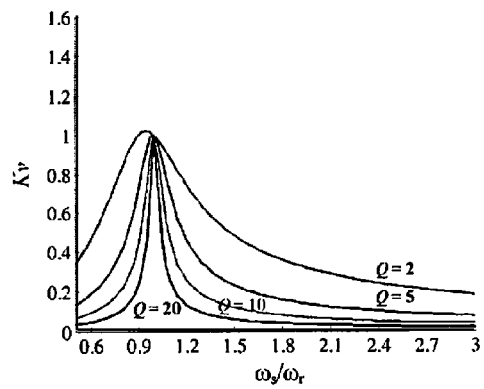
FIG. 12D is a diagram showing the relationships between $K_v$ and $\omega_s/\omega_r$ with different combinations of the values of Q when m=2.5.
Figure 12E:
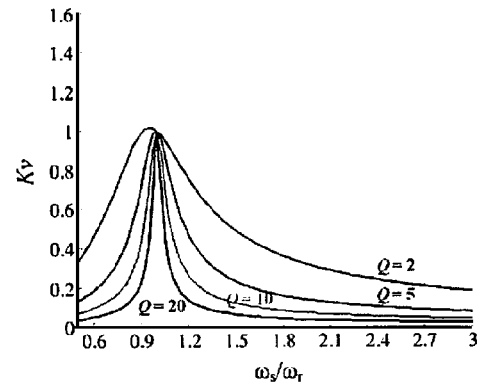
FIG. 12E is a diagram showing the relationships between $K_v$ and $\omega_s/\omega_r$ with different combinations of the values of Q when m=3.

FIG. 10 shows the waveform of v$_{AB}$. Based on FIG. 5, the voltage across the equivalent inductor L$_s$=L$_{s1}$+L$_{s2}$, v$_{Ls}$, is $$v_{Ls} = \begin{cases} 0 & \varphi \le \omega t < \alpha \\ \omega L_s I_m \cos(\omega t - \varphi) & \alpha \le \omega t < \pi + \varphi \end{cases} \quad (15)$$

v$_{AB,H}$ in FIG. 5 is neglected in the following analysis as the high-frequency impedance of L$_s$ is large. Thus, consider the low-frequency component of v$_{AB}$, v$_{AB,L}$, $$v_{AB,L} = v_{dc}d(t) - v_{dc}[1 - d(t)] \quad (16)$$

$$= v_{dc}[2d(t) - 1]$$

where d(t) is the duty cycle of S$_1$ and S$_4$. The duty cycle of S$_2$ and S$_3$ thus equals 1−d(t).

By applying KVL, $$v_{AB,L} = v'_{in} - v_{Ls} = \begin{cases} 0 & \varphi \le \omega t < \alpha \\ V_m \sin\omega t - \omega L_s I_m \cos(\omega t - \varphi) & \alpha \le \omega t < \pi + \varphi \end{cases}. \quad (17)$$

By putting (17) into (16), $$d(t) = \quad (18)$$

$$\begin{cases} \dfrac{1}{2} & \varphi \le \omega t < \alpha \\ \dfrac{1}{2} + \dfrac{\sqrt{V_m^2 - 2\omega V_m I_m L_s \sin\varphi + \omega^2 L_s^2 I_m^2}}{2v_{dc}} \sin(\omega t - \phi) & \alpha \le \omega t < \pi + \varphi \end{cases}$$

where $$\phi = \tan^{-1}\dfrac{\omega L_s I_m \cos\varphi}{V_m - \omega L_s I_m \sin\varphi}.$$

Based on (18), the minimum and maximum duty cycles, d$_{min}$ and d$_{max}$, are $$d_{max} = \begin{cases} \dfrac{1}{2} + \dfrac{\sqrt{V_m^2 - 2\omega V_m I_m L_s \sin\varphi + \omega^2 L_s^2 I_m^2}}{2v_{dc}} & \alpha \le \dfrac{\pi}{2} + \phi \\ \max\left\{\left[1 - d\left(\dfrac{\pi + \varphi}{\omega}\right)\right], d\left(\dfrac{\alpha}{\omega}\right)\right\} & \alpha > \dfrac{\pi}{2} + \phi \end{cases} \quad (19)$$

$$d_{min} = 1 - d_{max} \quad (20)$$

FIG. 11A to 11D show the variations of d(t) over a line cycle at α=0°, 45°, 90° and 145°, respectively.

Preferably, a resonant converter as shown in FIG. 4 is composed of the switching network 404, and may be composed of additional components such as a resonant inductor L$_r$, a resonant capacitor C$_r$, a transformer T$_r$, an output filter. Optionally, an electrical load 102 is coupled to the resonant converter.

As described in (18), the duty cycles of the switches vary with the line frequency. V$_{AB,L}$ in FIG. 5 will have small effect on the output, as the impedance of C$_r$ is very high. Thus, only the high-frequency component of v$_{AB}$, v$_{AB,H}$ is considered in the following discussion. Let K$_v$ be the ratio between the rms values of the voltage across R$_{eq}$, v$_R$, (|v$_R$|) and v$_{AB,H}$(|v$_{AB,H}$|). With reference to FIG. 5, $$K_v\left(\dfrac{\omega_s}{\omega_r}\right) = \dfrac{|v_R|}{|v_{AB,H}|} = \dfrac{|R_{eq} // j\omega_s L_m|}{\left|R_{eq} // j\omega_s L_m + j\omega_s L_r + \dfrac{1}{j\omega_s C_r}\right|} \quad (21)$$

$$= \dfrac{m\left(\dfrac{\omega_s}{\omega_r}\right)^2}{\sqrt{\left\{mQ\dfrac{\omega_s}{\omega_r}\left[1 - \left(\dfrac{\omega_s}{\omega_r}\right)^2\right]\right\}^2 + \left[(m+1)\left(\dfrac{\omega_s}{\omega_r}\right)^2 - 1\right]^2}}$$

where $$Q = \dfrac{Z_r}{R_{eq}}$$

is the quality factor, $$Z_r = \sqrt{\dfrac{L_r}{C_r}}$$

is the characteristic impedance, $$m = \dfrac{L_m}{L_r},$$

ω$_s$=2πf$_s$, and f$_s$ is the switching frequency, and $$\omega_r = \dfrac{1}{\sqrt{L_r C_r}}$$

is the angular resonant frequency.

The relationships between K$_v$ and ω$_s$/ω$_r$ with different combinations of the values of Q and m is shown in FIG. 12. K$_v$ is sensitive to Q and is less sensitive to m for m>1.

The waveform of v$_{AB}$ as shown in FIG. 10 is even symmetrical. For the sake of simplicity in the analysis, only the fundamental frequency component is considered in the following analysis. Based on Fourier analysis, the fundamental component of $v_{AB,H}$, $v^F_{AB,H}$ is $$v^F_{AB,H}(t) = V^F_{AB,H}(v_{dc}, d)\cos(\omega_s t) \quad (22)$$
$$= \frac{4v_{dc}}{\pi}\sin[\pi d(t)]\cos(\omega_s t)$$

where $$V^F_{AB,H}(v_{dc}, d) = \frac{2}{T_s}\int_{-\frac{T_s}{2}}^{\frac{T_s}{2}} v_{AB}(t)\cos\omega_s t\, dt = \frac{4v_{dc}}{\pi}\sin[\pi d(t)].$$

Thus, the lamp power can be expressed as $$P_{LED}(\alpha) = \frac{K_v^2\left(\frac{\omega_s}{\omega_r}\right)|v^F_{AB,H}(t)|^2}{R_{eq}(\alpha)} \quad (23)$$
$$= \frac{8v_{dc}^2 K_v^2\left(\frac{\omega_s}{\omega_r}\right)\sin^2[\pi d(t)]}{\pi^2 R_{eq}(\alpha)}$$

where $$|v^F_{AB,H}| = \frac{V^F_{AB,H}}{\sqrt{2}}$$

is the rms value of $v^F_{AB,H}$.

The equivalent load resistance $R_{eq}$ at different LED current can be expressed in terms of the LED array voltage as $$R_{eq}(\alpha) = \frac{2n^2 v_{LED}}{i_{LED}(\alpha)} \quad (24)$$

Detailed proof of (24) is given in the follows.

The high frequency component of $v_{AB}$, $v_{AB,H}$ is only considered here as the low frequency component is blocked by the capacitor $C_r$. In FIG. 5, the magnetizing inductance of the transformer $L_m$ is much larger than the equivalent resistance $R_{eq}$ at high-frequency switching. Thus, $L_m$ is neglected in the analysis. The phasor for representing $v^F_{AB,H}$ in (22) $\tilde{v}^F_{AB,H}$ is $$\tilde{v}^F_{AB,H} = \frac{4v_{dc}}{\sqrt{2}\pi}\sin[\pi d(t)]\angle 0°. \quad (24.1)$$

The current $i_p$ flowing through $L_r$ and $C_r$ is $$\tilde{i}_p = \frac{i_{LED}(\alpha)}{\sqrt{2}\,n}\angle -\gamma \quad (24.2)$$

where $\gamma$ is the phase difference between $v^F_{AB,H}$ and $i_p$.

So the output power transferred to the secondary side of transformer is $$P = \tilde{v}_{AB,H}\tilde{i}_p\cos(-\gamma) \quad (24.3)$$
$$= \frac{2v_{dc}i_{LED}(\alpha)}{n\pi}\sin[\pi d(t)]\cos\gamma.$$

Thus, $$\cos\gamma = \frac{n\pi P}{2v_{dc}i_{LED}(\alpha)\sin[\pi d(t)]}. \quad (24.4)$$

The voltages across $L_r$, $v_{L_r}$, and $C_r$, $v_{C_r}$, are $$\tilde{v}_{L_r} = \tilde{i}_p\omega_s L_r\angle 90° = \frac{i_{LED}(\alpha)\omega_s L_r}{n}\angle(90°-\gamma), \quad (24.5)$$

$$\tilde{v}_{C_r} = \frac{\tilde{i}_p}{\omega_s C_r}\angle -90° = \frac{i_{LED}(\alpha)}{n\omega_s C_r}\angle(90°-\gamma). \quad (24.6)$$

Based on KVL, the voltage across $R_{eq}$, $v_R$, is $$\tilde{v}_R = \tilde{v}^F_{AB,H} - \tilde{v}_{L_r} - \tilde{v}_{C_r} \quad (24.7),$$

$R_{eq}$ is approximated by assuming that the imaginary part of $\tilde{v}_R$ in (24.7) is negligible. Thus, by considering the real part of (24.7) and substituting (24.1), (24.5), and (24.6) into (24.7), $$R_{eq} = Re\left[\frac{\tilde{v}_R}{\tilde{i}_p}\right] = \frac{2n^2 v_{LED}}{i_{LED}(\alpha)}, \quad (24.8)$$

$$|\tilde{v}_R| = |\tilde{i}_p|R_{eq} = \sqrt{2}\,nv_{LED}. \quad (24.9)$$

By putting (24) into (23), $$v_{dc} = \frac{n\pi v_{LED}}{2K_v\left(\frac{\omega_s}{\omega_r}\right)\sin[\pi d(t)]}. \quad (25)$$

According to FIG. 12, in order to ensure that the resonant circuit operates in the inductive mode, $$\frac{\omega_s}{\omega_r} > 1.$$

$K_v$ will then be less than unity. Since the minimum value of the term $\sin[\pi d(t)]$ in the denominator of (25) is $\sin[\pi d_{max}]$ or $\sin[\pi d_{min}]$, the minimum value of $v_{dc}$ required, $v_{dc,min}$, is determined by putting $$K_v\left(\frac{\omega_s}{\omega_r}\right) = 1$$

into (25). Thus, $$v_{dc,min} = \frac{n\pi v_{LED}}{2\sin[\pi d_{max}]} = \frac{n\pi v_{LED}}{2\sin[\pi d_{min}]}. \quad (26)$$

By putting the maximum value of duty cycle obtained in (19) into (26) and solving for $v_{dc,min}$ at different lamp power, FIG.

13 shows the value of $v_{dc,min}$ against α. Then, by substituting (18) into (25) with $v_{dc}=v_{dc,min}$, FIG. 14 shows the variation of $K_v$ over one line cycle at different firing angle of the TRIAC, in which the minimum value of $K_v$, $K_{v,min}$ occurs when sin[πd(t)]=1. Thus, $$K_{v,min} = \frac{n\pi v_{LED}}{2v_{dc,min}}. \tag{27}$$

Figure 15:
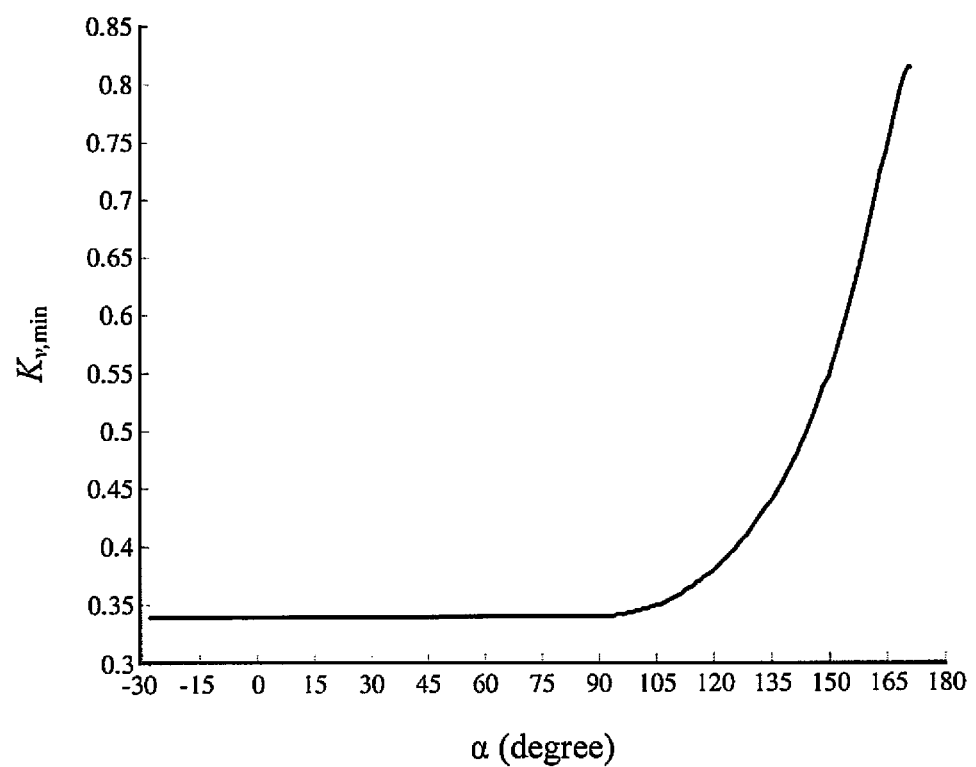
FIG. 15 is a diagram showing the variation of $K_{v,min}$ against $\alpha$.

The variation of $K_{v,min}$ against α is shown in FIG. 15.

Figure 4B:
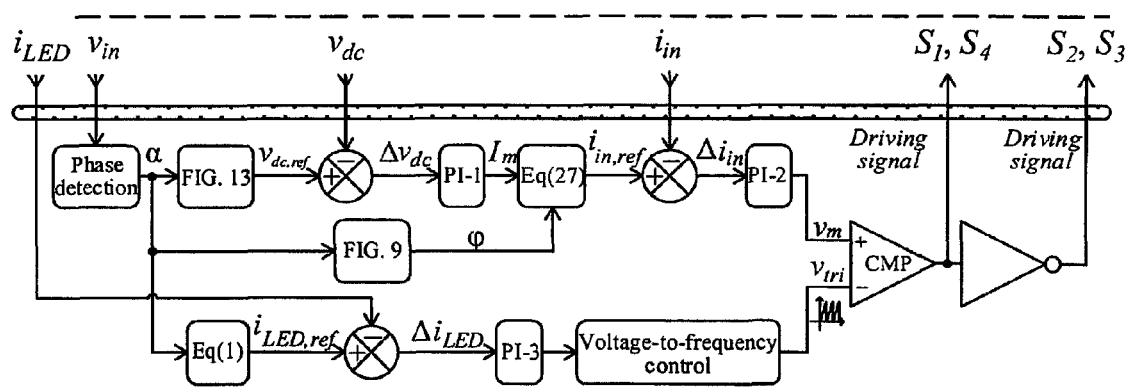
FIG. 4B is a block diagram of a controller of the electrical load driving apparatus of FIG. 4A.

With reference to FIG. 4B, there is shown a controller arranged to regulate the lamp power at different firing angles by sensing the input voltage $v_{in}$, input current $i_{in}$, dc-link voltage $v_{dc}$, and LED array current $i_{LED}$, and controlling both the duty cycle and switching frequency of the switches. Preferably, the purpose of adjusting the duty cycle is to perform the input current shaping. Additionally, the purpose of adjusting the switching frequency is to regulate the lamp power so that the line-frequency harmonics are removed. The control method is described as follows.

Preferably, the firing angle α is firstly detected by the sensed $v_{in}$. It will be used to derive the reference dc-link voltage $V_{dc,ref}$ based on the curve $v_{dc,min}$-α depicted in FIG. 13. The error between the actual dc-link voltage $v_{dc}$ and $V_{dc,ref}$, $\Delta v_{dc}$ will be passed to a PI-controller, namely PI-1, to derive the reference input current $i_{in,ref}$ which will be in the form of $$i_{in,ref} = \begin{cases} 0, & \varphi \leq \omega t < \alpha \\ I_m \sin(\omega t - \varphi), & \alpha \leq \omega t < \pi + \varphi \end{cases}. \tag{28}$$

Figure 9:
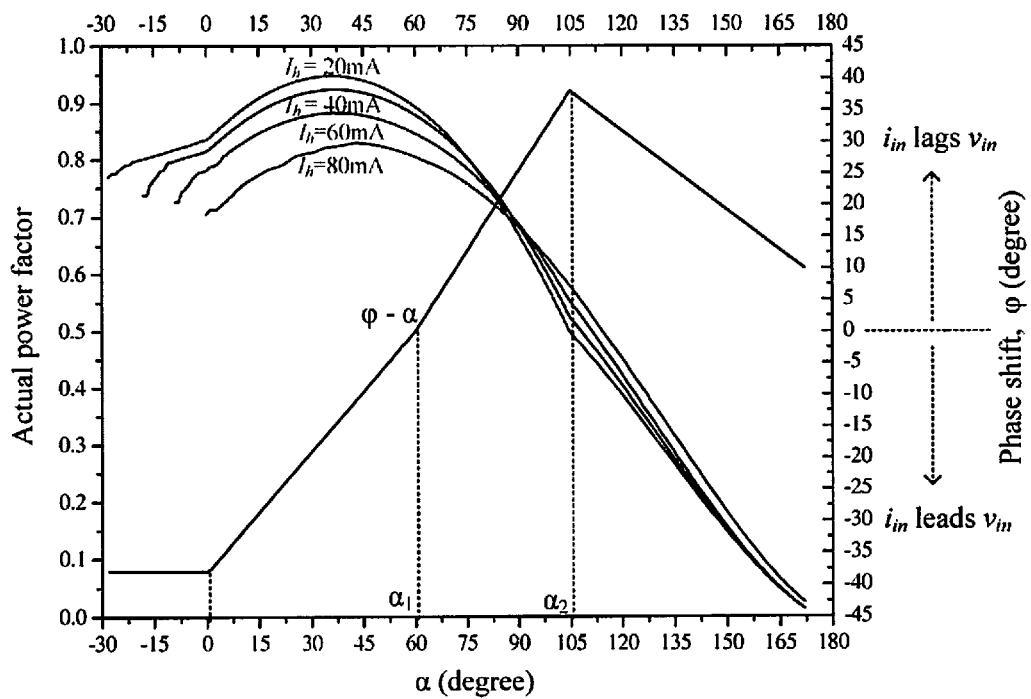
FIG. 9 is a diagram showing a fixed relationship between $\alpha$ and $\phi$ is designed by linearizing the curve $\phi$–$\alpha$ when the holding current is 80 mA in FIG. 8.

The error between the actual input current $i_{in}$ and $i_{in,ref}$, $\Delta i_{in}$, will be passed to a PI-controller, namely PI-2, to derive the modulating signal $v_m$ for the PWM modulator. The gate signals for $S_1$~$S_4$ are derived by comparing $v_m$ with the carrier signal $v_{tri}$. In (28), φ is determined by considering the firing angle, as depicted in FIG. 9. The amplitude $I_m$ is determined by the output of PI-1. Thus, the duty cycles of the switches are controlled through this control mechanism.

Additionally, the switching frequency is controlled as follows. Preferably, after determining the firing angle, a reference LED array current, $i_{LED,ref}$ is derived as follows, $$i_{LED,ref} = \frac{P_{LED}(\alpha)}{v_{LED}}. \tag{29}$$

The error between the actual LED array current $i_{LED}$ and $i_{LED,ref}$, $\Delta i_{LED}$ will be passed to a PI-controller, namely PI-3, to vary the frequency of the carrier signal $v_{tri}$. Preferably, the above controls are performed on a microcontroller.

In an example embodiment, the values of $L_{s1}=L_{s2}=L_s/2$, $L_{in}$, $C_{in}$, n, $L_r$, $C_r$, $L_m$, $C_{dc}$, $L_o$ and $C_o$ are determined by considering the following parameters:
$P_r$: Rated lamp power
$V_m$: Amplitude of the voltages $v_{in}$ and $v'_{in}$ expressed in (2) and (3)
$f_{s,min}$: Minimum switching frequency of the switches
$\Delta i_s$: The ripple current through the inductors $L_{s1}$ and $L_{s2}$ when the switching frequency is the minimum
$I_{h,max}$: Maximum designed holding current of the TRIAC
$\phi_0$: Introduced phase shift when α=5° shown in FIG. 9
$v_{dc,r}$: $v_{dc}$ at the rated lamp power $\Delta v_{dc,r}$: peak-to-peak ripple voltage on $v_{dc}$ at the rated lamp power
$\Delta i_{Lo}$: rms value of the ripple current through $L_o$ The amplitude of $i_{in}$, $I_m$, is determined by using (6). That is, $$I_m = \frac{I_{h,max}}{\sin(\alpha_0 - \varphi_0)}, \tag{30}$$

$L_s$ is then determined by considering that the switching frequency is the lowest. The duty cycle of $S_1$ and $S_4$, d should be maximum. Based on (16) and (17), $v'_{in}$ should be maximum when d is maximum, so $v_{Ls}$ is neglected for the sake of simplicity in calculation. By substituting (16) into (17), $$d_{max} = \frac{v_{in} + v_{dc}}{2v_{dc}} \tag{31}$$

$$L_s \frac{\Delta i_s}{d_{max}(1/f_{s,min})} = v_{dc} - v_{in}. \tag{32}$$

By substituting (31) into (32), $$L_s = \frac{d_{max}(v_{dc} - v_{in})}{f_{s,min}\Delta i_s} \tag{33}$$
$$= \frac{(v_{dc,r}^2 - v_m^2)}{2v_{dc}f_{s,min}\Delta i_s}$$

where $\Delta i_s$ is taken to be 40% of $I_m$ when the switching frequency is the lowest. Therefore, $$L_{s1} = L_{s2} = \frac{L_s}{2}. \tag{34}$$

$L_{in}$ and $C_{in}$ are determined by considering that the high-frequency ripple current through $L_{s1}$ and $L_{s2}$ flows through $C_{in}$ at $f_{s,min}$. Assume that the impedance of $L_{in}$ is larger than three times the impedance of $C_{in}$ at $f_{s,min}$. Thus, $$2\pi f_{s,min}L_{in} > 3\frac{1}{2\pi f_{s,min}C_{in}} \Rightarrow L_{in}C_{in} > \frac{3}{4\pi^2 f_{s,min}^2}. \tag{35}$$

The value of n is determined by (26)

$$n = \frac{2v_{dc,r}}{\pi v_{LED}}\sin(\pi d_{max}) = \frac{2v_{dc,r}}{\pi v_{LED}}\sin(\pi d_{min}). \tag{36}$$

With α=0°, based on (24), $R_{eq}(0)$ equals $$R_{eq}(0) = \frac{2n^2 v_{LED}^2}{P_r}. \tag{37}$$

If the quality factor Q at the rated power is $Q_r$, the characteristic impedance $Z_r$ is equal to $$Z_r = Q_r R_{eq}(0) \tag{38}$$

Figure 16:
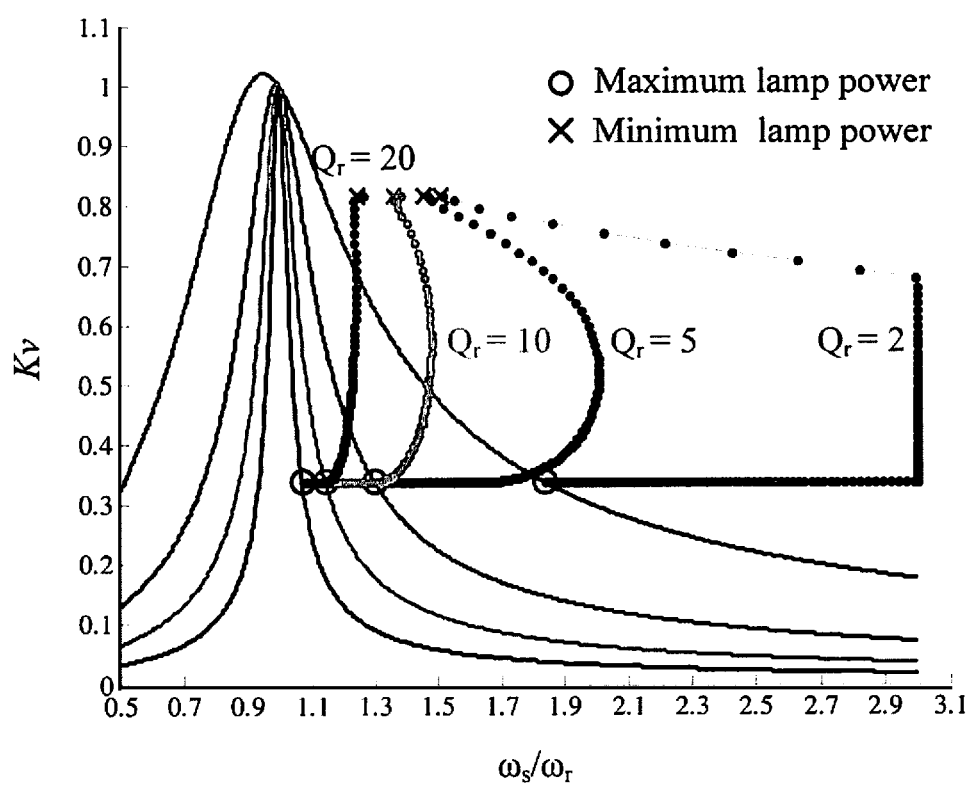
FIG. 16 is a diagram showing the trajectories of $K_{v,min}$ against $$\frac{\omega_s}{\omega_r}$$

Thus, based on FIG. 12, FIG. 16 shows the trajectories of $K_{v,min}$ against $$\frac{\omega_s}{\omega_r}$$

for different lamp power and m=2.5. It can be observed from the trajectories that, if $Q_r$ is small, for example, $Q_r=2$, there is considerable variation of the switching frequency from the rated power to the dimmed power, and if $Q_r$ is large, for example, $Q_r=20$, the lamp power is too sensitive to the variation to the switching frequency.

Thus, it can be observed that $Q_r=5$ gives the compromise between the above two considerations. Thus, based on (37) and (38), $$Z_r = \sqrt{\frac{L_r}{C_r}} = 5 R_{eq}(0) \Rightarrow L_r = \frac{100 n^4 v_{LED}^4}{P_r^2} C_r. \quad (39)$$

Based on (21), the resonant frequency is designed at $f_{s,min}$. Thus, $$f_{s,min} = \frac{1}{2\pi\sqrt{L_r C_r}}. \quad (40)$$

Thus, by solving (39) and (40) for $L_r$ and $C_r$, it can be shown that $$L_r = \frac{5 n^2 v_{LED}^2}{\pi P_r f_{s,min}}, \quad (41)$$

$$C_r = \frac{P_r}{20 \pi n^2 v_{LED}^2 f_{s,min}}. \quad (42)$$

The value of $L_m$ is chosen by taking m=2.5. Thus, based on (21), $$L_m = m L_r \quad (43)$$

$$= \frac{12.5 n^2 v_{LED}^2}{\pi P_r f_{s,min}}.$$

For the sake of simplicity in the design, the value of $C_{dc}$ is designed by assuming that the input current is in phase with the supply voltage at the rated power condition.

$$P_r = \frac{1}{2\pi} \int_0^{2\pi} V_m I_m \sin^2 \omega t \, d\omega t \quad (44)$$

$$= \frac{V_m I_m}{2}$$

$C_{dc}$ absorbs the difference between the input power and the average lamp power. Thus, the maximum variation of the energy $\Delta E_c$ stored in the capacitor is $$\Delta E_C = \frac{P_r}{\omega}. \quad (45)$$

Assume that $v_{dc}$ varies between $v_{dc,r}$ and $v_{dc,r}+\Delta v_{dc,r}$, and $\Delta v_{dc,r} \ll v_{dc,r}$ $$\frac{1}{2}C_{dc}(v_{dc,r}+\Delta v_{dc,r})^2 - \frac{1}{2}C_{dc}v_{dc,r}^2 = \frac{P_r}{\omega} \Rightarrow C_{dc} \cong \frac{P_r}{\omega v_{dc,r}\Delta v_{dc,r}} \quad (46)$$

The value of $L_o$ is designed by considering the ripple current $\Delta i_{L_o}$ through it. Based on (24.9), the RMS value of voltage $v'_R$, $|\tilde{v}'_R|$ in FIG. 4A is $$|\tilde{v}'_R| = \sqrt{2} v_{LED} \quad (47).$$

So the voltage $v'_R$ is $$v'_R = 2 v_{LED} |\sin \omega_s t| \quad (48)$$

$$L_o \frac{\Delta i_{L_o}}{\Delta t} = v'_R - v_{LED} \Rightarrow L_o \cong \frac{\left(2\sqrt{3} - \frac{2\pi}{3}\right) v_{LED}}{2\pi f_{s,min} \Delta i_{L_o}}. \quad (49)$$

The value of $C_o$ is estimated by cut-off frequency $f_o$ of the filter formed by $L_o$ and $C_o$ being $$f_o = \frac{1}{2\pi\sqrt{L_o C_o}} \Rightarrow C_o = \frac{1}{4\pi^2 f_o^2 L_o}. \quad (50)$$

In an example embodiment, an experimental 110V/60 Hz prototype of the electrical load driving apparatus has been built and tested. The rated power is 7.2 W. It is based on the requirements given in Table I, and based on the design method discussed earlier, the component values are given in Table II. The microcontroller used is MC9S08QE128. The lamp can be dimmed from 7.2 W to 0.3 W with a TRIAC dimmer.

TABLE I

Specifications of the prototype

| Parameter | Value |
|---|---|
| $P_r$ | 7.2 W |
| $V_m$ | 156 V |
| $v_{LED}$ | 24 V |
| $f_{s,min}$ | 80 kHz |
| $\Delta i_s$ | 49 mA |
| $I_{h,max}$ | 80 mA |
| $\alpha_0$ | 5° |
| $\phi_0$ | −35° |
| $v_{dc,r}$ | 200 V |
| $\Delta v_{dc,r}$ | 11.46 V (about 5% of the DC-link voltage) |
| $\Delta i_{L_o}$ | 260 mA (about 20% of the LED current) |

TABLE II

Component values used in the experimental prototype

| Parameter | Value |
|---|---|
| $L_{in}$ | 470 uH |
| $L_{s1} = L_{s2}$ | 5 mH |
| $L_r$ | 5 mH |

TABLE II-continued

Component values used in the experimental prototype

| Parameter | Value |
| --- | --- |
| $L_m$ | 12.5 mH |
| $L_o$ | 1 mH |
| $C_{in}$ | 33 nF(110 VAC) |
| $C_{dc}$ | 10 uF(250 VDC) |
| $C_r$ | 790 pF |
| n | 1.8 |
| $C_o$ | 33 uF(35 VDC) |

Alternatively, the electrical load driving apparatus is designed in any other parameters.

Referring to FIG. 17, there is shown the waveforms of the input voltage $v_{in}$, input current $i_{in}$, and LED array current $i_{LED}$. The average current and peak-to-peak ripple current of the LED are measured. FIG. 17A shows the waveforms when the lamp is connected to the ac mains without TRIAC. It can be seen that the input current is in phase with the voltage. FIGS. 17B, 17C, 17D, 17E, and 17F show the corresponding waveforms when the firing angle is −25°, 45°, 90°, 145°, and 172°, respectively. The LED array current ripples in all cases are found to be less than 25%. The phase of the input current varies with the firing angle, so as to introduce the required reactive power and thus maintain the conduction state of the TRIAC.

Figure 13:
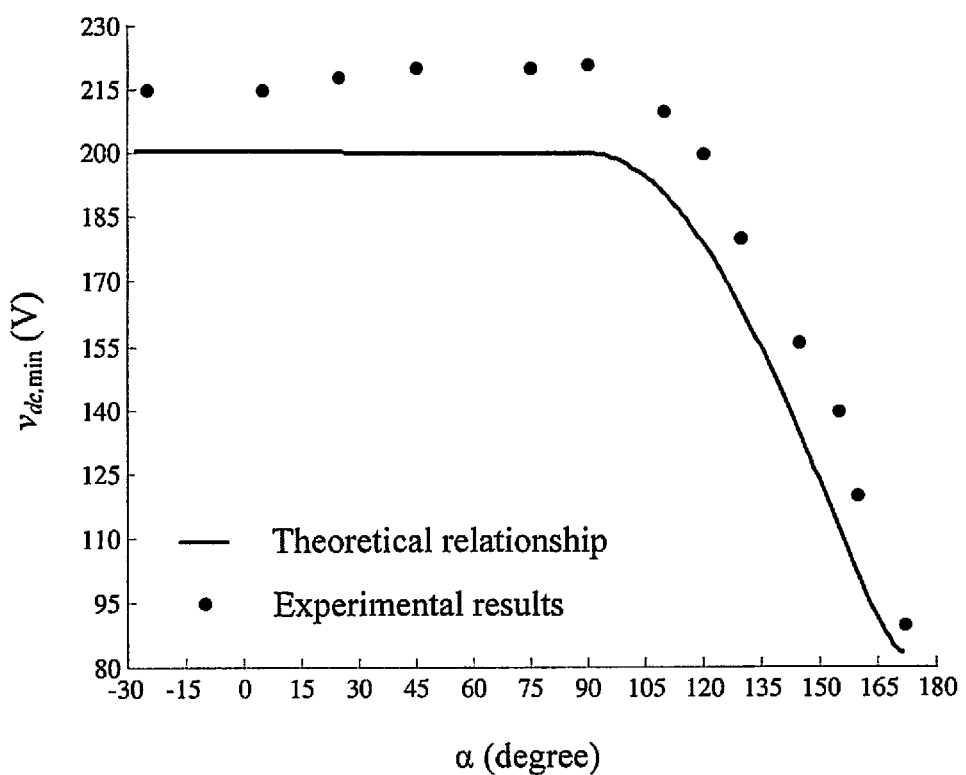
FIG. 13 is a diagram showing the experimental results and the theoretical relationship of $v_{dc}$ versus the firing angle.
Figure 14A:
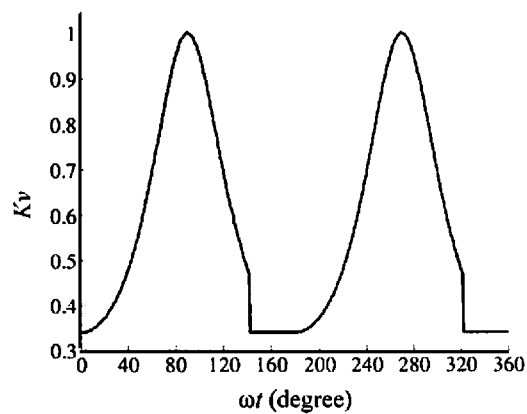
FIG. 14A is a diagram showing the variation of $K_v$ over one line cycle when firing angle $\alpha=0°$.
Figure 14B:
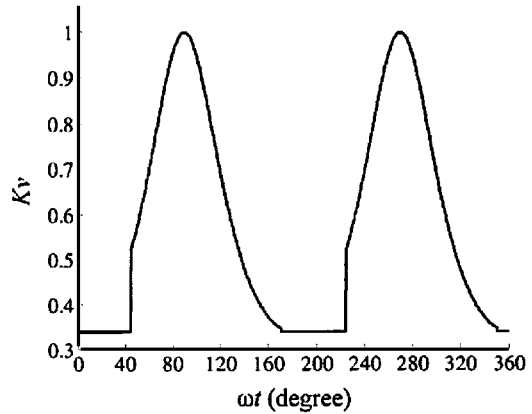
FIG. 14B is a diagram showing the variation of $K_v$ over one line cycle when firing angle $\alpha=45°$.
Figure 14C:
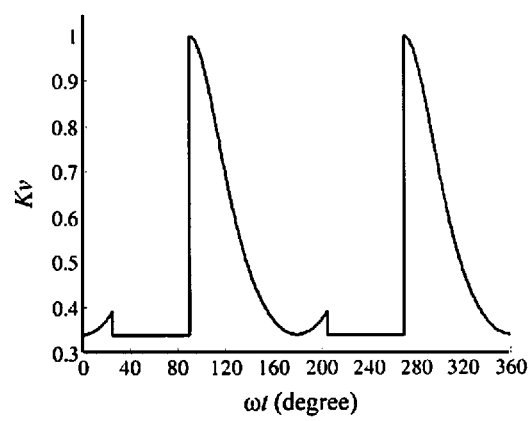
FIG. 14C is a diagram showing the variation of $K_v$ over one line cycle when firing angle $\alpha=90°$.
Figure 14D:
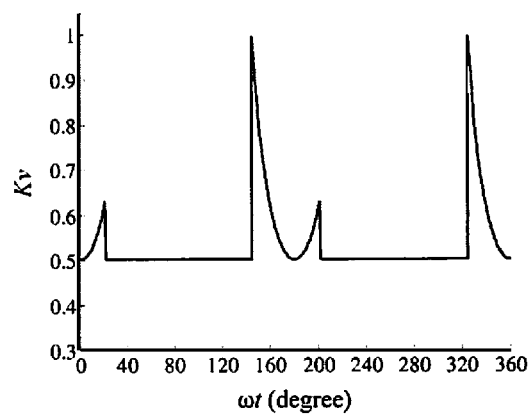
FIG. 14D is a diagram showing the variation of $K_v$ over one line cycle when firing angle $\alpha=145°$.

Referring to FIG. 18, there is shown the theoretical and measured switching frequencies of the switches versus the lamp power. Both of them are in close agreement. The relationship between the output power and firing angle is given in FIG. 19. They are in linear relationship, confirming the proposed driving method. FIG. 13 shows the experimental results of $v_{dc}$ versus the firing angle. Its profile is similar to the theoretical prediction.

Advantageously, an LED driver prototype has been built and evaluated. The lamp power can be adjusted from full power of 7.2 W to 0.3 W with the true firing angle down to 172°.

Advantageously, the electrical load driving apparatus is operable to provide high compatibility to use conventional TRIAC-based light dimmer for the dimming of the LED illumination devices, without the necessity to modify the existing dimmer circuit. The electrical load driving apparatus is also operable to provide wide dimming range to LED devices with conventional thyristor circuits.

Without deviating from the spirit of the invention, the electrical load driving apparatus can be implemented to drive any electrical load, such as one or more motors, one or more incandescent or fluorescent lamp. In some embodiments, the electrical load driving apparatus can be implemented to drive one or more driving circuits, or any other electrical/electronic circuits.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An electrical load driving apparatus comprising: a thyristor circuit arranged to control a transmission of an electric power to an electrical load; wherein the thyristor circuit is connected to a conversion module arranged to convert a characteristic of the thyristor circuit to operate with a load characteristic of the electrical load; and wherein the conversion module is arranged to alter a reactive power delivered from the thyristor circuit.

2. The electrical load driving apparatus in accordance with claim 1, wherein the conversion module is further arranged to modulate an output current of the thyristor circuit.

3. The electrical load driving apparatus in accordance with claim 1, wherein the conversion module is arranged to maintain a conductive state of the thyristor circuit during an operation of the electrical load.

4. The electrical load driving apparatus in accordance with claim 3, wherein the conversion module is arranged to maintain a threshold of the output current on or above a holding current of the thyristor circuit to maintain the conductive state of the thyristor circuit during an operation of the electrical load.

5. The electrical load driving apparatus in accordance with claim 4, wherein the conversion module further includes a switching network.

6. The electrical load driving apparatus in accordance with claim 5, wherein the switching network is controlled by a controller to shape the output current of the thyristor circuit.

7. The electrical load driving apparatus in accordance with claim 6, wherein the controller is arranged to shape the output current of the thyristor circuit by adjusting a duty cycle and/or a switching frequency of the switching network.

8. The electrical load driving apparatus in accordance with claim 7, wherein the controller adjusts the duty cycle and/or the switching frequency of the switching network to alter the reactive power.

9. The electrical load driving apparatus in accordance with claim 5, wherein the conversion module further includes a resonant convertor arranged to be controlled by the controller to regulate the electric power delivered to the electrical load.

10. The electrical load driving apparatus in accordance with claim 9, wherein the resonant convertor is arranged to maintain a linearity of the relationship between a firing angle and the electric power delivered to the electrical load.

11. The electric load driving apparatus in accordance with claim 10, wherein the controller is arranged to maintain the linearity of the relationship between a firing angle and the electric power delivered to the electrical load by
    determining a firing angle of the thyristor circuit;
    selecting a corresponding phase shift relationship based on the firing angle; and
    modifying the linearity of the electric power delivered to the electrical load based on the selected corresponding phase shift relationship.

12. The electrical load driving apparatus in accordance with claim 9, wherein the controller is further arranged to regulate the electric power delivered to the electrical load by removing line-frequency harmonics.

13. The electrical load driving apparatus in accordance with claim 12, wherein the controller is arranged to remove the line frequency harmonics by adjusting the switching frequency of the switching network.

14. The electrical load driving apparatus in accordance with claim 5, wherein the switching network comprises four switches.

15. The electrical load driving apparatus in accordance with claim 5, wherein the switching network and the controller are integrated with a semiconductor packaging technology.

16. The electrical load driving apparatus in accordance with claim 1, wherein the electrical load is one or more light emitting diodes (LEDs).

17. The electrical load driving apparatus in accordance with claim 1, wherein the thyristor circuit comprises a TRIAC device and a plurality of resistive and capacitive components.

18. A method for operating an interface between a thyristor circuit and an electrical load comprising the steps of:
    detecting electric variables of the electrical load, the thyristor circuit and the interface;
    determining operating characteristics of the thyristor circuit; and
    adjusting the operating characteristics of the thyristor circuit based on the detected electric variables of the electrical load, the thyristor circuit and the interface to deliver a regulated electric power to the electrical load, wherein the operating characteristics include a reactive power delivered from the thyristor circuit.

19. The method for operating an interface between a thyristor circuit and an electrical load in accordance with claim 18, further comprising the steps of:
    delivering at least one output signal to a switching circuit of the interface to adjust the operating characteristics of the thyristor circuit.

20. The method for operating an interface between a thyristor circuit and an electrical load in accordance with claim 19, wherein the at least one output signals to the switching circuit are arranged to control a switching frequency and a duty cycle of the switching circuit.

21. The method for operating an interface between a thyristor circuit and an electrical load in accordance with claim 19, wherein detecting electric variables of the electrical load, the thyristor circuit and the interface further comprises the steps of:
    detecting a current signal $i_{LED}$ of the electrical load;
    detecting an output current signal $i_{in}$ and an output voltage signal $v_{in}'$ of the thyristor circuit; and
    detecting an operating voltage signal $v_{dc}$ of the interface.

22. The method for operating an interface between a thyristor circuit and an electrical load in accordance with claim 19, wherein determining operating characteristics of the thyristor circuit further comprising the steps of:
    determining a firing angle $\alpha$ of the thyristor circuit based on the detected output voltage signal $v_{in}'$ of the thyristor circuit.

23. The method for operating an interface between a thyristor circuit and an electrical load in accordance with claim 22, wherein adjusting the operating characteristics of the thyristor circuit further comprising the steps of:
    determining a reference voltage signal $v_{dc,ref}$ of the interface based on the firing angle $\alpha$ with a predetermined interface logic;
    determining an error voltage signal $\Delta v_{dc}$ of the interface based on the reference voltage signal $v_{dc,ref}$ and the operating voltage signal $v_{dc}$ of the interface;
    deriving a reference current signal $i_{in,ref}$ of the thyristor circuit based on the error voltage signal $\Delta v_{dc}$ of the interface;
    determining an error current signal $\Delta i_{in}$ of the thyristor circuit based on the reference current signal $i_{in,ref}$ of the thyristor circuit and the detected output current signal $i_{in}$ of the thyristor circuit; and
    deriving a modulating signal $v_m$ based on the error current signal $\Delta i_{out}$ of the thyristor circuit.

24. The method for operating an interface between a thyristor circuit and an electrical load in accordance with claim 23, wherein deriving a reference current signal $i_{in,ref}$ of the thyristor circuit based on the error voltage further comprising the steps of:
    determining a phase shift of the reference current signal $i_{in,ref}$ of the thyristor circuit based on the firing angle $\alpha$ and the predetermined interface logic; and
    determining an amplitude of the reference current signal $i_{in,ref}$ of the thyristor circuit based on the error voltage signal $\Delta v_{dc}$ of the interface.

25. The method for operating an interface between a thyristor circuit and an electrical load in accordance with claim 23, wherein adjusting the operating characteristics of the thyristor circuit further comprising the steps of:
    determining a reference current signal $i_{LED,ref}$ of the electrical load based on the firing angle $\alpha$;
    determining an error current signal $\Delta i_{LED,ref}$ of the electrical load based on the reference current signal $i_{LED,ref}$ of the electrical load and the detected current signal $i_{LED}$ of the electrical load; and
    deriving a carrier signal $v_{tri}$ based on the error current signal $\Delta i_{LED}$ of the electrical load.

26. The method for operating an interface between a thyristor circuit and an electrical load in accordance with claim 25, wherein adjusting the operating characteristics of the thyristor circuit further comprising the steps of:
    comparing the carrier signal $v_{tri}$ with the modulating signal $v_m$ to derive the at least one output signal to be delivered to the switching circuit.

* * * * *